(12) United States Patent
Rachev et al.

(10) Patent No.: US 7,778,897 B1
(45) Date of Patent: Aug. 17, 2010

(54) RISK MANAGEMENT SYSTEM AND METHOD FOR DETERMINING RISK CHARACTERISTICS EXPLAINING HEAVY TAILS OF RISK FACTORS

(75) Inventors: Svetlozar Todorov Rachev, Santa Barbara, CA (US); Boryana Svetlozarova Racheva-Iatova, Sofia (BG); Boris Blagoev Hristov, Varna (BG)

(73) Assignee: FinAnalytica, Inc., Seattle, WA (US)

( * ) Notice: Subject to any disclaimer, the term of this patent is extended or adjusted under 35 U.S.C. 154(b) by 1637 days.

(21) Appl. No.: 10/339,580

(22) Filed: Jan. 10, 2003

Related U.S. Application Data

(60) Provisional application No. 60/346,978, filed on Jan. 11, 2002.

(51) Int. Cl.
*G06Q 40/00* (2006.01)
(52) U.S. Cl. .................................. 705/35; 705/36 R
(58) Field of Classification Search .............. 705/35–45
See application file for complete search history.

(56) References Cited

U.S. PATENT DOCUMENTS

| 7,228,290 | B2 * | 6/2007 | Browne et al. ............ 705/36 R |
| 2003/0061152 | A1 * | 3/2003 | De et al. ...................... 705/38 |
| 2003/0172017 | A1 * | 9/2003 | Feingold et al. ............... 705/35 |
| 2003/0177240 | A1 * | 9/2003 | Gulko et al. ................. 709/226 |

OTHER PUBLICATIONS

Department of Economics, UCSB Departmental Working Papers (University of California, Santa Barbara) Year 2000 Paper wp8-00; "The Stable non-Gaussian Asset Allocation: A Comparison with the Classical Gaussian Approach", Yesim Tokat; Svetlozar T. Rachev; Eduardo Schwartz.*

Chamberlain, Trevor W., Cheung, C. Sherman, & Kwan, Clarence C. Y.. (1990). Optimal Portfolio Selection Using the General Multi-Index Model: a Stable Paretian Framework. Decision Sciences, 21(3), 563. Retrieved Mar. 28, 2010, from ABI/INFORM Global. (Document ID: 345884).*

Financial Market Models with Levy Process and Time Varying Volatility, Young Shin Kim, S.T. Rachev, Michele Bianchi, Frank J Fabozzi. Journal of Banking and Finance: Volume and Issue 327. 2008. pp. 1363-1378.*

* cited by examiner

*Primary Examiner*—Hani Kazimi
*Assistant Examiner*—Abhishek Vyas
(74) *Attorney, Agent, or Firm*—Patrick J. S. Inouye; Scott E. Smith

(57) ABSTRACT

A risk management system and method of determining risk characteristics of portfolios by generating risk factor scenarios based on stable Paretian distributions is provided. The system includes a database for storing any needed input, output, and intermediate results data. At least one module from each of the predefined types can be employed to produce a corresponding result—either intermediate or final. The risk management system and method provide possibilities to use flexible multivariate distribution exhibiting heavy-tails, skewness and different dependence structure, and characterizing the whole distribution of a given financial variable, allows users to perform flexible stress tests on all calculation levels, supplies fast analysis due to the possibility to use intermediate results in many subsequent calculations and to employ several calculation modules in parallel, allows for an efficient enterprise-wide risk management because of the possibility intermediate results to be used by many users.

28 Claims, 36 Drawing Sheets

Table 2

| ID_Settings2 | RF1 | ........ | Rfi | RFi+1 | ......... | RFn |
|---|---|---|---|---|---|---|
| Alpha | | | | | | |
| Beta | | | | | | |
| Sigma | | | | | | |
| Mu | | | | | | |
| Simulation 1 | | | | | | |
| Copula | | | | | | |
| Subordinator | | | | | | |
| Stable | | | | | | |
| Value | | | | | | |
| Simulation 2 | | | | | | |
| Copula | | | | | | |
| Subordinator | | | | | | |
| Stable | | | | | | |
| Value | | | | | | |
| ... | | | | | | |
| Simulation S | | | | | | |
| Copula | | | | | | |
| Subordinator | | | | | | |
| Stable | | | | | | |
| Value | | | | | | |

| ID_Settings1 | RF1 | ........ | Rfi | RFi+1 | ......... | RFn |
|---|---|---|---|---|---|---|
| Alpha | 1.4 | ... | 1.8 | 1.5 | ... | 1.1 |
| Beta | 0.1 | ... | -0.05 | 0 | ... | 0 |
| Sigma | 0.03 | ... | 0.04 | 0.01 | ... | 0.05 |
| Mu | 0.001 | ... | 0 | 0 | ... | -0.03 |
| Simulation 1 | | | | | | |
| Copula | 0.7 | ... | 0.4 | | ... | 0.47 |
| Subordinator | 1.5 | ... | | | ... | 1.9 |
| Stable | 0.03 | ... | | | ... | 0.05 |
| Value | 105 | ... | 602.87 | 17.9 | ... | 304 |
| Simulation 2 | | | | | | |
| Copula | 0.3 | ... | 0.82 | | ... | 0.16 |
| Subordinator | 0.9 | ... | | | ... | 2.5 |
| Stable | 0.04 | ... | | | ... | 0.05 |
| Value | 99 | ... | 598.54 | 19 | ... | 280 |
| ... | ... | ... | ... | ... | ... | ... |
| Simulation S | ... | ... | ... | ... | ... | ... |
| Copula | 0.5 | ... | 0.1 | | ... | 0.55 |
| Subordinator | 1.9 | ... | | | ... | 1.8 |
| Stable | 0.09 | ... | | | ... | 0.02 |
| Value | 110 | ... | 600.75 | 16 | ... | 302 |

Table 2

| ID_Copula_Settings | RF1 | ... | RFN | List of additional parameters |
|---|---|---|---|---|
| RF1 | 0.1 | ... | 0.9 | 5 |
| RF2 | | ... | -0.5 | |
| ... | | ... | | |
| RFN | | ... | 0.2 | |

FIG. 9

Table 3

| ID_Copula_Settings | RF1 | ... | RFN | List of additional parameters |
|---|---|---|---|---|
| RF1 | | | | 0.1 |
| RF2 | | | | 0.23 |
| ... | | | | ... |
| RFN | | | | 0.58 |

Table 4

| ID_Copula_Settings | RF1 | ... | RFN | List of additional parameters |
|---|---|---|---|---|
| RF1 | 0.1 | ... | 0.9 | |
| RF2 | | ... | -0.5 | |
| ... | | ... | | |
| RFN | | ... | 0.2 | |

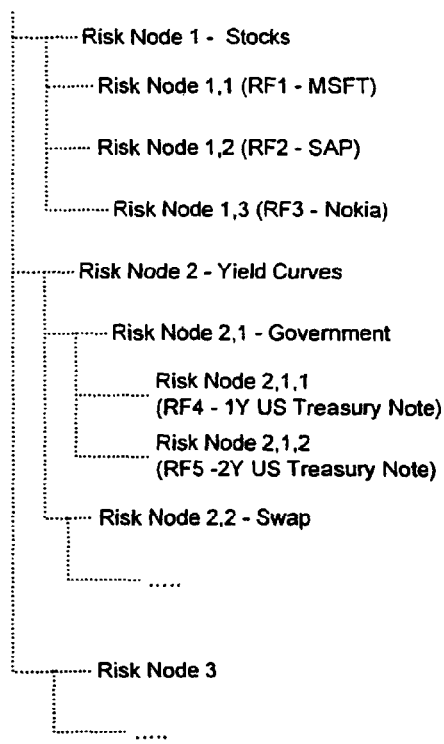
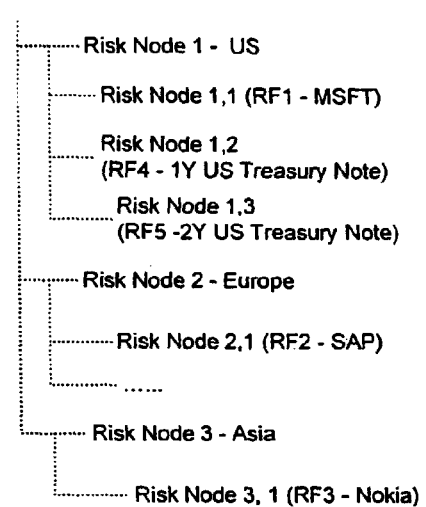

Risk Hierarchy 1

- Risk Node 1 - Stocks
  - Risk Node 1,1 (RF1 - MSFT)
  - Risk Node 1,2 (RF2 - SAP)
  - Risk Node 1,3 (RF3 - Nokia)
- Risk Node 2 - Yield Curves
  - Risk Node 2,1 - Government
    - Risk Node 2,1,1 (RF4 - 1Y US Treasury Note)
    - Risk Node 2,1,2 (RF5 -2Y US Treasury Note)
  - Risk Node 2,2 - Swap
    - .....
- Risk Node 3
  - .....

Risk Hierarchy 2

- Risk Node 1 - US
  - Risk Node 1,1 (RF1 - MSFT)
  - Risk Node 1,2 (RF4 - 1Y US Treasury Note)
  - Risk Node 1,3 (RF5 -2Y US Treasury Note)
- Risk Node 2 - Europe
  - Risk Node 2,1 (RF2 - SAP)
  - ......
- Risk Node 3 - Asia
  - Risk Node 3, 1 (RF3 - Nokia)

Database representation

| Risk Factor | Risk Hierarchy 1 | Risk Hierarchy 2 | ... |
|---|---|---|---|
| RF1 | 1,1 | 1,1 | ... |
| RF2 | 1,2 | 2,1 | ... |
| RF3 | 1,3 | 3,1 | ... |
| RF4 | 2,1,1 | 1,2 | ... |
| RF5 | 2,1,2 | 1,3 | ... |
| ... | ... | ... | ... |

FIG. 10

Gaussian Marginals df 16.00

| | | | | | | | | | | | | | | | |
|---|---|---|---|---|---|---|---|---|---|---|---|---|---|---|---|
| 1.00 | 0.92 | 0.91 | 0.11 | 0.88 | 0.89 | 0.88 | 0.15 | 0.88 | 0.85 | 0.86 | 0.82 | 0.82 | 0.82 | 0.82 | 0.79 |
| 0.92 | 1.00 | 0.97 | 0.11 | 0.91 | 0.95 | 0.93 | 0.15 | 0.91 | 0.90 | 0.91 | 0.84 | 0.86 | 0.87 | 0.86 | 0.81 |
| 0.91 | 0.97 | 1.00 | 0.10 | 0.91 | 0.95 | 0.95 | 0.16 | 0.90 | 0.91 | 0.91 | 0.83 | 0.86 | 0.87 | 0.87 | 0.82 |
| 0.11 | 0.11 | 0.10 | 1.00 | 0.10 | 0.10 | 0.10 | 0.37 | 0.12 | 0.11 | 0.12 | 0.15 | 0.09 | 0.10 | 0.10 | 0.11 |
| 0.88 | 0.91 | 0.91 | 0.10 | 1.00 | 0.96 | 0.93 | 0.15 | 0.93 | 0.93 | 0.92 | 0.86 | 0.90 | 0.91 | 0.90 | 0.85 |
| 0.89 | 0.95 | 0.95 | 0.10 | 0.96 | 1.00 | 0.97 | 0.15 | 0.96 | 0.96 | 0.95 | 0.89 | 0.93 | 0.94 | 0.93 | 0.88 |
| 0.88 | 0.93 | 0.95 | 0.10 | 0.93 | 0.97 | 1.00 | 0.16 | 0.94 | 0.95 | 0.94 | 0.87 | 0.92 | 0.92 | 0.92 | 0.86 |
| 0.15 | 0.15 | 0.16 | 0.37 | 0.15 | 0.15 | 0.16 | 1.00 | 0.17 | 0.16 | 0.16 | 0.24 | 0.15 | 0.16 | 0.15 | 0.16 |
| 0.88 | 0.91 | 0.90 | 0.12 | 0.93 | 0.96 | 0.94 | 0.17 | 1.00 | 0.97 | 0.97 | 0.92 | 0.95 | 0.96 | 0.95 | 0.90 |
| 0.85 | 0.90 | 0.91 | 0.11 | 0.93 | 0.96 | 0.95 | 0.16 | 0.97 | 1.00 | 0.97 | 0.89 | 0.96 | 0.97 | 0.96 | 0.89 |
| 0.86 | 0.91 | 0.91 | 0.12 | 0.92 | 0.95 | 0.94 | 0.16 | 0.97 | 0.97 | 1.00 | 0.94 | 0.94 | 0.95 | 0.97 | 0.91 |
| 0.82 | 0.84 | 0.83 | 0.15 | 0.86 | 0.89 | 0.87 | 0.24 | 0.92 | 0.89 | 0.94 | 1.00 | 0.87 | 0.89 | 0.90 | 0.94 |
| 0.82 | 0.86 | 0.86 | 0.09 | 0.90 | 0.93 | 0.92 | 0.15 | 0.95 | 0.96 | 0.94 | 0.87 | 1.00 | 0.98 | 0.96 | 0.90 |
| 0.82 | 0.87 | 0.87 | 0.10 | 0.91 | 0.94 | 0.92 | 0.16 | 0.96 | 0.97 | 0.95 | 0.89 | 0.98 | 1.00 | 0.98 | 0.91 |
| 0.82 | 0.86 | 0.87 | 0.10 | 0.90 | 0.93 | 0.92 | 0.15 | 0.95 | 0.96 | 0.97 | 0.90 | 0.96 | 0.98 | 1.00 | 0.92 |
| 0.79 | 0.81 | 0.82 | 0.11 | 0.85 | 0.88 | 0.86 | 0.16 | 0.90 | 0.89 | 0.91 | 0.94 | 0.90 | 0.91 | 0.92 | 1.00 |

Stable Marginals df 3.00
Correlation Matrix

| | | | | | | | | | | | | | | | |
|---|---|---|---|---|---|---|---|---|---|---|---|---|---|---|---|
| 1.00 | 0.92 | 0.92 | 0.81 | 0.88 | 0.89 | 0.89 | 0.85 | 0.86 | 0.85 | 0.85 | 0.82 | 0.81 | 0.81 | 0.81 | 0.78 |
| 0.92 | 1.00 | 0.98 | 0.86 | 0.92 | 0.95 | 0.94 | 0.89 | 0.90 | 0.90 | 0.90 | 0.87 | 0.85 | 0.86 | 0.85 | 0.82 |
| 0.92 | 0.98 | 1.00 | 0.87 | 0.91 | 0.94 | 0.96 | 0.90 | 0.89 | 0.90 | 0.91 | 0.87 | 0.85 | 0.85 | 0.86 | 0.83 |
| 0.81 | 0.86 | 0.87 | 1.00 | 0.81 | 0.84 | 0.84 | 0.88 | 0.80 | 0.80 | 0.81 | 0.81 | 0.75 | 0.76 | 0.76 | 0.74 |
| 0.88 | 0.92 | 0.91 | 0.81 | 1.00 | 0.95 | 0.94 | 0.89 | 0.93 | 0.93 | 0.92 | 0.89 | 0.89 | 0.90 | 0.89 | 0.86 |
| 0.89 | 0.95 | 0.94 | 0.84 | 0.95 | 1.00 | 0.98 | 0.93 | 0.96 | 0.96 | 0.95 | 0.92 | 0.92 | 0.93 | 0.92 | 0.88 |
| 0.89 | 0.94 | 0.96 | 0.84 | 0.94 | 0.98 | 1.00 | 0.93 | 0.94 | 0.95 | 0.95 | 0.92 | 0.91 | 0.92 | 0.92 | 0.88 |
| 0.85 | 0.89 | 0.90 | 0.88 | 0.89 | 0.93 | 0.93 | 1.00 | 0.90 | 0.89 | 0.91 | 0.90 | 0.86 | 0.87 | 0.87 | 0.84 |
| 0.86 | 0.90 | 0.89 | 0.80 | 0.93 | 0.96 | 0.94 | 0.90 | 1.00 | 0.97 | 0.96 | 0.93 | 0.95 | 0.96 | 0.95 | 0.91 |
| 0.85 | 0.90 | 0.90 | 0.80 | 0.93 | 0.96 | 0.95 | 0.89 | 0.97 | 1.00 | 0.97 | 0.94 | 0.96 | 0.97 | 0.96 | 0.92 |
| 0.85 | 0.90 | 0.91 | 0.81 | 0.92 | 0.95 | 0.95 | 0.91 | 0.96 | 0.97 | 1.00 | 0.95 | 0.94 | 0.96 | 0.97 | 0.92 |
| 0.82 | 0.87 | 0.87 | 0.81 | 0.89 | 0.92 | 0.92 | 0.90 | 0.93 | 0.94 | 0.95 | 1.00 | 0.91 | 0.92 | 0.92 | 0.96 |
| 0.81 | 0.85 | 0.85 | 0.75 | 0.89 | 0.92 | 0.91 | 0.86 | 0.95 | 0.96 | 0.94 | 0.91 | 1.00 | 0.97 | 0.96 | 0.92 |
| 0.81 | 0.86 | 0.85 | 0.76 | 0.90 | 0.93 | 0.92 | 0.87 | 0.96 | 0.97 | 0.96 | 0.92 | 0.97 | 1.00 | 0.98 | 0.93 |
| 0.81 | 0.85 | 0.86 | 0.76 | 0.89 | 0.92 | 0.92 | 0.87 | 0.95 | 0.96 | 0.97 | 0.92 | 0.96 | 0.98 | 1.00 | 0.94 |
| 0.78 | 0.82 | 0.83 | 0.74 | 0.86 | 0.88 | 0.88 | 0.84 | 0.91 | 0.92 | 0.92 | 0.96 | 0.92 | 0.93 | 0.94 | 1.00 |

FIG. 21

RISK MANAGEMENT SYSTEM AND METHOD FOR DETERMINING RISK CHARACTERISTICS EXPLAINING HEAVY TAILS OF RISK FACTORS

CROSS-REFERENCE TO RELATED APPLICATION

This application claims priority to U.S. Provisional Application Ser. No. 60/346,978, filed on Jan. 11, 2002, the entire disclosure and drawings of which are hereby incorporated herein by reference.

TECHNICAL FIELD

This invention relates to risk management systems and methods, and more particularly to determining risk characteristics explaining heavy tails of risk factors.

BACKGROUND

Risk Management Systems based on Risk Factor Scenario Generation are widely used by financial institutions, resource-based corporations, trading organizations, governments, and other users (referred to herein as institutions) for the purposes of risk characteristics' estimation, risk analysis and management, and portfolio optimization. Risk factors can comprise a variety of data, including interest rates or rate spreads, foreign exchange rates, market indices, macroeconomic variables, etc. A risk factor scenario represents a hypothetical market situation and generally comprises values for the risk factors and an assigned probability of occurrence.

Risk Management Systems based on Risk Factor Scenario Generation are used in satisfying the everyday needs of the institutions to answer questions like "What will happen to the value (or other characteristic) of the institution's portfolio if Dow Jones goes 300 points down and the 2 year Treasury rates up to 10% tomorrow?" or "What is the maximum possible loss of the institution's portfolio over a period of 5 days at a predefined probability level?" —the so-called Value-at-Risk (VaR) measure. By answering these and similar questions, managers identify appropriate hedging strategies, establish the amount of the necessary economic capital, and actively manage the risk exposures of the institution.

Institutions commonly employ Risk Management Systems based on risk factor scenario generation for the purposes of risk analysis and portfolio management including but not limited to Value-at-Risk and Credit Value-at-Risk analysis, and portfolio optimization.

The Market Risk Management Systems employ scenario generation in order to obtain possible values for risk factors such as exchange rates, stock prices, interest rates, etc. at the time of the analysis horizon. Each of the instruments (positions) in the portfolio under consideration is then re-valuated according to each realized scenario for the risk factors affecting the price of the instrument (position). Afterwards the sample distribution function of the portfolio is obtained and the required risk characteristics such as Value-at-Risk, Shortfall etc. are calculated.

The proper generation of the possible values for the risk factors is the key factor for a realistic estimation of the final results.

In Credit Risk Systems the problem is quite alike, but usually the risk factors are of different nature—such as credit spreads, industry indices and macro-variables. In such systems the credit quality of counterparty is generally based on the realizations of the variables such as industry indices and macro-factors that affect the creditworthiness of the counterparty. Having scenarios for these variables, the value of the exposure to a given counterparty is obtained under each scenario. Then the sample distribution function for the portfolio comprising all the exposures is obtained and the required credit risk characteristics such as Credit Value-at-Risk, Credit Shortfall etc. are calculated. The proper determination of possible scenarios for the drivers (risk factors) of credit events is a key factor for the realistic determination of the risk characteristics.

Portfolio Optimization Systems go one step further and aim at identifying the portfolio structure that in general keeps the return on the same level as in the current portfolio (or on other pre-specified level) and simultaneously improves (minimizes) a chosen risk characteristic. The user may alternatively choose to maximize the return keeping the level of the risk characteristic, or specify any appropriate utility function. Most of the methods for portfolio optimization require a set of scenarios for a selected universe of instruments as an input argument. The latter are usually obtained by applying proper valuation models to the scenarios for the risk factors that affect the instruments' prices. In this respect, a Portfolio Optimization System can be viewed as an extended Risk Management System.

To summarize, Risk Management Systems generally perform the following steps: first—generation of scenarios for relevant risk factors, second—obtaining relevant characteristic for each instrument under consideration according to every risk factor scenario, third—calculating final results on the basis of the previously obtained instrument characteristics under the different risk factor scenarios. The final results within a Risk Management System, as mentioned above, comprise: Value-at-Risk and Shortfall of the portfolio representing the analyzed set of instruments for Market Risk Management System; Credit Value-at-Risk and Credit Shortfall for Credit Risk Management System; optimal allocation of the capital among the analyzed set of instruments for Portfolio Optimization System. The latter description is not aimed at narrowing the possible outputs and uses of a Risk Management System, but rather at offering the reader an intuition for the scope of the problem.

The first step of the process described above is Risk Factor Scenario Generation; the second is Instrument Characteristics Estimation; the third is Risk Characteristics Estimation.

Risk Management Systems generally use three approaches to obtain risk factor scenarios: first—user-defined scenarios, second—scenarios obtained from historical market data observations (the so-called empirical scenarios) and third—scenarios based on simulation of random variables with a pre-defined probabilistic distribution.

Due to the fast growing complexity of financial markets, the rapidly changing environment and the sudden market downturns, it becomes vitally important for institutions to employ Risk Management Systems capable of generating risk factor scenarios and estimating risk characteristics in an accurate and representative way.

The rapidly changing financial environment makes the use of empirical scenarios obsolete and unreliable. Moreover, such a method assumes that the only events that might occur in the future are those already observed in the past, the latter posing an unrealistic limitation.

Other commonly used Risk Factor Scenario Generation methods within Risk Management Systems are based on the assumption that risk factors' returns have multivariate normal distribution. The multivariate normal distribution then provides a straightforward method to produce scenarios. These methods are known to produce non-realistic results in attempt to model extreme events thus often underestimating the risk characteristics.

Despite this problem, currently there are no serious attempts to employ more sophisticated distributional functions for describing the behavior of risk factors. A major reason for the latter is that the computational time for evaluating parameters of a complex distribution function for a great number of risk factors well exceeds the reasonable time limit for performing a risk analysis.

Many independent academic researchers have proposed various interesting algorithms for more adequate modeling of the financial variables. However, none of these methods goes beyond the scope of purely academic research and/or the algorithms proposed are not suitable for the multi-dimensional nature of financial reality. See RiskMetrics "Return to RiskMetrics: The Evolution of a Standard" April 2001, p. 25: "However, it has often been argued that the true distribution of returns (even after standardizing by the volatility) implies a larger probability of extreme returns than that implied from the normal distribution. Although we could try to specify a distribution that fits returns better, it would be a daunting task, especially if we consider that the new distribution would have to provide a good fit across all asset classes. There has been a lot of discussion of these issues and some alternative distributions have been proposed. But up until now academics as well as practitioners have not agreed on an industry standard heavy-tailed distribution (or family of distributions)."

Another problem of proper generation of risk factor scenarios, as pointed above, is the complexity of financial markets. A typical bank portfolio relies on thousands of risk factors with various natures—interest rates, exchange rates, market indices, implied volatilities, credit spreads, etc. Each of them possesses different characteristics, different variability behavior and, moreover, the dependencies between subsets of the risk factors can be of diverse nature. Thus, the underlying probabilistic model from which financial risk factor scenarios are sampled must be very flexible.

There are numerous publications on copula approach in finance (see for example the works of Embrechts Paul). However, all of these research papers deal only with modeling the dependency of financial returns but not with the entire distribution. None of the papers discusses issues related to the practicability of the proposed models and does not report computational requirements and an execution time.

In the book of Rachev, S. T., Mittnik, K., Stable Paretian Models In Finance, John Wiley and Sons Ltd. 2001, it is proposed to model financial series by multivariate sub-Gaussian model. This model results in symmetric stable Paretian distributions for each financial series under consideration. However, a shortcoming of this model is that all marginal distributions must have the same index of stability, which implies that every risk factor has equally heavy tails. The latter means that the probability of an extreme event is equal for each risk factor after normalization. This is the first difference from the present invention. As a second point, the book provides only a mathematical model without proposing a method, framework, or system for its real application for solving practical problems.

In the Mercury 1.5 risk management software application developed by the applicant, the idea of using stable sub-Gaussian models to model financial returns is modified and implemented in computer algorithm. Mercury 1.5 is an important step ahead in the development of Risk Management Software, since it is the first attempt to model financial variables (risk factors) with more flexible and realistic distributions.

However, there are certain deficiencies:

The dependencies are considered to exist only in the center of the distributions of financial series, which means that extreme events happen independently across different securities. That contradicts to the financial reality.

The system suffers in many aspects from its monolithic architecture. Each step in the risk factor scenario generation process is executed every time the system is run. The latter creates speed performance problems and limits the user's flexibility.

It determines only a VaR figure and does not allow for thorough scenario analysis that is crucial for risk managers.

SUMMARY

It is an object of the present invention to provide a novel Risk Management System based on risk factor scenario generation and method that obviates or mitigates at least one of the above-mentioned disadvantages.

In one aspect, the present invention provides a method of risk characteristic estimation based on generating scenarios for risk factor returns that employ stable Paretian distributions wherein the method comprises the following steps:

selecting required number of scenarios S;

selecting a set of M instruments and the corresponding amounts;

selecting a set of N risk factors;

transforming historical observations for the set of risk factors to an appropriate form;

obtaining stable Paretian parameters for each of the risk factors in the set of risk factors by estimating stable Paretian parameters based on the transformed historical observations where at least two different Stable Parameters Calculation Modules can be employed if there is more than one risk factor, or by retrieving stored stable Paretian parameters (the stable Paretian parameters might be estimated for a sub-set of the set of risk factors and read for the rest of the risk factors in the set of risk factors);

obtaining stable Paretian scenarios for the set of risk factors by retrieving stored stable Paretian scenarios or by simulating dependent stable Paretian random variables wherein simulations are performed in the following way:

converting the transformed historical observations for each of risk factor in the set of risk factors to a uniform distribution by applying a stable Paretian distribution function with the obtained parameters or an empirical distribution function to each of the observations in the set of transformed historical observations;

obtaining distribution parameters of a chosen class of copula distribution, by using estimations based on data resulting from the converting step for the set of transformed historical observations wherein at least one Copula Parameters Estimation Module can be employed, or by retrieving stored copula parameters;

obtaining S N-dimensional copula scenarios based on the copula distribution by generating random variables following the copula distribution wherein at least two different Copula Simulations Modules can be employed if there is more than one scenario to be produced, or by retrieving stored copula scenarios;

generating S N-dimensional scenarios with normal one-dimensional marginal distributions and the copula distribution by applying inverse normal distribution function to each component of the obtained copula scenarios wherein at least two Normal Distribution Modules can be employed if there is more than one scenario to be produced;

obtaining S stable subordinator simulations for each risk factor in the set of risk factors by retrieving stored stable subordinator simulations or by generating stable subordinator simulations based on the obtained stable Paretian parameters of the risk factor in the set of risk factors wherein at least two different Stable Simulations Modules can be employed if there is more than one scenario to be produced. The stable subordinator simulations might be estimated for only a subset of the set of risk factors and read for the rest of the risk factors in the set of risk factors;

obtaining the set of S stable Paretian scenarios for the set of risk factors by multiplying each component of each of the normal scenarios obtained in the transforming step with the corresponding stable subordinator simulation.

According to the present invention, the other way of simulating stable Paretian scenarios for the set of risk factors comprises the following steps:

converting the set of transformed historical observations for each of risk factor in the set of risk factors to a uniform distribution by applying a stable Paretian distribution function with the obtained parameters or an empirical distribution function to each of the observations in the set of transformed historical observations;

obtaining distribution parameters of a chosen class of copula distribution, by using estimations based on data resulting from the converting step for the set of transformed historical observations wherein at least one Copula Parameters Estimation Module can be employed, or by retrieving stored copula parameters;

obtaining S N-dimensional copula scenarios based on the copula distribution by generating random variables following the copula distribution wherein at least two different Copula Simulations Modules can be employed if there is more than one scenario to be produced, or by retrieving stored copula scenarios;

obtaining the set of S stable Paretian scenarios for the set of risk factors by applying to each component of each of the obtained copula scenarios the inverse stable Paretian distribution function with the estimated stable Paretian parameters for the corresponding risk factor, wherein at least two Stable Distribution Modules can be employed if there is more than one scenario to be produced. Each of the resulting S stable Paretian scenarios has N one-dimensional stable Paretian marginal distributions with the estimated stable Paretian parameters and the estimated copula distribution;

transforming the stable Paretian scenarios by applying the inverse transformation to the one performed in order to obtain risk factor value scenarios;

estimating instrument characteristics of each instrument in the set of instruments under each risk factor value scenario;

estimating risk characteristics of the set of instruments;

generating a report on the risk characteristics in the appropriate format.

In yet another aspect the present invention provides a Risk Management System operating on a set of risk factors and a set of instruments, comprising:

at least one Transformation Module from each type out of a pre-defined non-empty set of Transformation Module types that transforms a set of risk factors' historical observations into the appropriate form;

at least one Inverse Transformation Module from each type out of a pre-defined non-empty set of Inverse Transformation Module types that transforms a set of scenarios for the set of risk factors to risk factor value scenarios;

at least one Stable Scenario Generation Module of Type I comprising at least one Stable Parameters Estimation Module from each type out of a pre-defined non-empty set of Stable Parameters Estimation Module types, that estimates stable Paretian parameters over a set of time-series data;

at least one Copula Parameters Estimation Module from each type out of a pre-defined non-empty set of Copula Parameters Estimation Module types, that estimates copula parameters for a given class of copula distributions over a set of time-series data;

at least one Stable Simulations Module from each type out of a pre-defined non-empty set of Stable Simulations Module types, that generates stable Paretian random variables;

at least one Copula Simulations Module from each type out of a pre-defined non-empty set of Copula Simulations Module types, that generates random variables from a given copula distribution;

at least one Normal Distribution Module from each type out of a pre-defined non-empty set of Normal Distribution Module types, that transforms a random number having uniform distribution to a random number having normal distribution and vice versa;

and/or at least one Stable Scenario Generation Module of Type II comprising at least one Stable Parameters Estimation Module from each type out of a pre-defined non-empty set of Stable Parameters Estimation Module types, that estimates stable Paretian parameters over a set of time-series data;

at least one Copula Parameters Estimation Module from each type out of a pre-defined non-empty set of Copula Parameters Estimation Module types, that estimates copula parameters for a given class of copula distributions over a set of time-series data;

at least one Copula Simulations Module from each type out of a pre-defined non-empty set of Copula Simulations Module types, that generates random variables from a given copula distribution;

at least one Stable Distribution Module from each type out of a pre-defined non-empty set of Stable Distribution Module types, that transforms a random number having uniform distribution to a random number having stable Paretian distribution and vice versa;

at least one Instrument Characteristics Estimation Module from each type out of a pre-defined non-empty set of Instrument Characteristics Estimation Module types;

at least one Risk Characteristics Module from each type out of a pre-defined non-empty set of Risk Characteristics Module types;

a database to store each intermediate and final result.

The modules communicate with each other and with the Database through appropriate connection means such as Network.

The present invention provides a Risk Management System and method that allows:

multiple Stable Parameters Estimation Modules and/or Copula Parameters Estimation Modules to simultaneously operate on risk factors data;

multiple Copula Simulation Modules to simultaneously operate on risk factors copula parameters data;

multiple Stable Distribution Modules to simultaneously operate on risk factors copula scenarios data and risk factors stable Paretian parameters data;

multiple Normal Distribution Modules to simultaneously operate on risk factors copula scenarios data;

Multiple Stable Simulations Modules to simultaneously operate on risk factors stable Paretian parameters data;

Multiple Transformation Modules to simultaneously operate on risk factors historical observations data;
Multiple Inverse Transformation Modules to simultaneously operate on risk factors stable Paretian scenarios data;
Multiple Instrument Characteristics Estimation Modules to simultaneously operate on risk factor value scenarios data;
Multiple Risk characteristics Modules to simultaneously operate on instrument characteristic data.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 9 illustrates a structure of the Database in one embodiment of the present invention.

FIG. 10 shows the contents of the Database wherein risk factors are structured in risk hierarchies.

FIG. 21 shows the copula parameter in the cases of stable Paretian marginal distributions and Gaussian marginal distributions estimated over a sample set of risk factors that represent credit-spreads' log-returns.

Like reference symbols in the various drawings indicate like elements.

DETAILED DESCRIPTION

In the current complex and rapidly changing environment of financial markets, Risk Management is vital for the smooth and successful operation of institutions worldwide. It has its significance not only at enterprise level, but also on macroeconomic level. The key regulator requirements that aim at ensuring vitality of the financial system in periods of market turbulence are based on risk management approaches. The most straightforward example is the capital requirements for general market risk, the latter based on Value-at-Risk figure of an institution's portfolio. Thus non-accurate estimation of risk characteristics causes catastrophic consequences especially in periods of market crashes.

For clarity, before discussing the present invention in detail, a more in-depth discussion of aspects of risk management systems based on scenario generation is provided with reference to FIGS. 1 through 6.

In conventional Risk Management systems based on scenario generation the scenarios are modeled either by normal or empirical distribution.

In the case of using normal distribution the main disadvantage is that normal distribution cannot model heavy tails, excess kurtosis and asymmetry of risk factors returns and more generally of financial data.

In the case of using empirical distribution it is assumed that the past trends will continue in the future. However, the future might encounter extreme events. This method is limited in forecasting the range of portfolio value changes and is not reliable in estimating low quantiles with a small number of observations in the tails.

Both approaches suffer from inability to accurately present the financial reality and produce misleading (frequently overly optimistic) results for possible losses and the magnitude of risk exposure.

Figure 1:
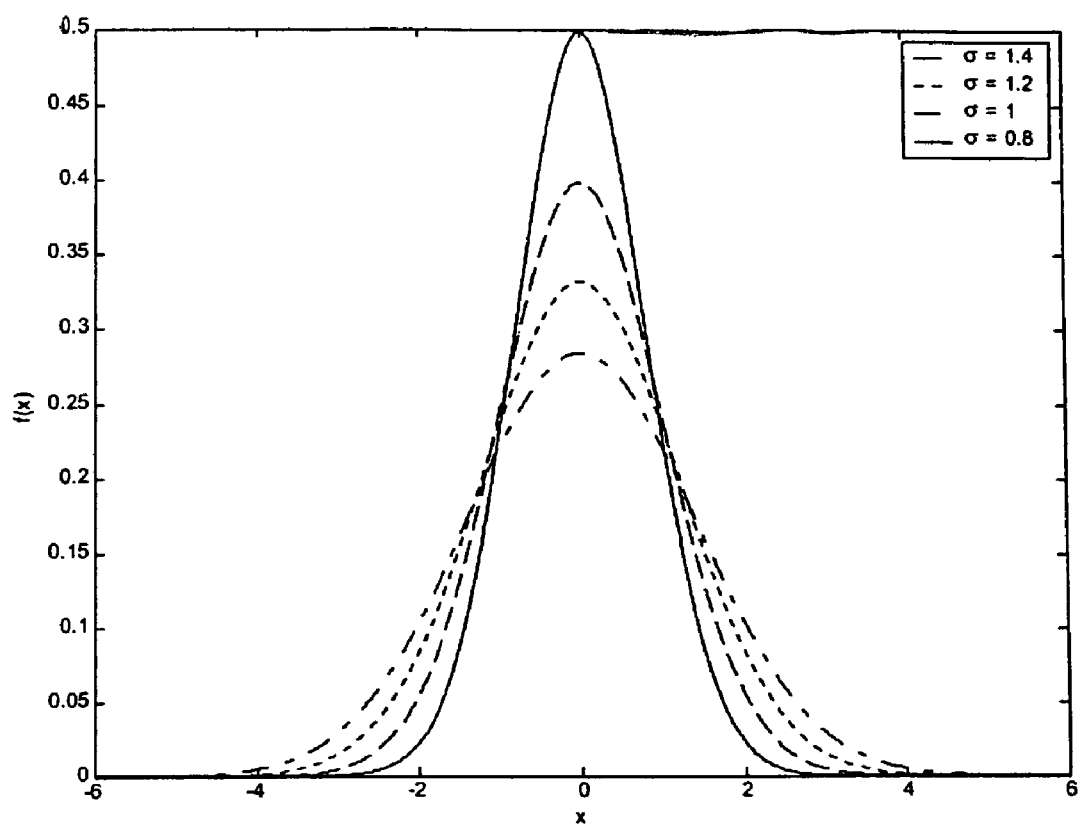
FIG. 1 shows a number of probability densities that can be obtained using the conventionally used univariate normal distribution.

FIG. 1 shows a number of probability densities that can be obtained using the conventionally used univariate normal distribution. Normal distributional family has exponentially decaying tails and is symmetric. The latter poses a serious problem with the existing risk management models since they are not able to properly model the risk of extreme losses and asymmetry of financial series returns.

Figure 2:
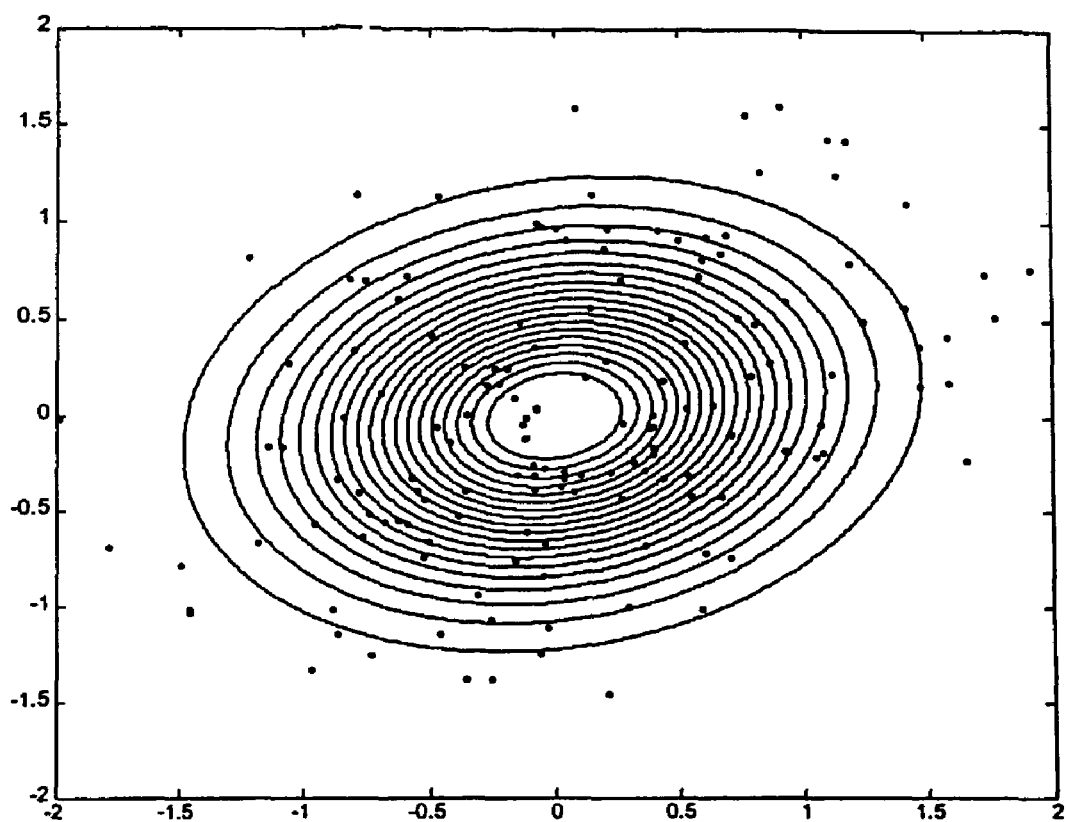
FIG. 2 shows the contour lines and 150 simulations drawn from a two-dimensional normal distribution with the variance of the first variable equal to 0.6, the variance of the second variable equal to 0.5, and a covariance of 0.15.

FIG. 2 shows 150 simulations drawn from a two-dimensional normal distribution with the variance of the first variable equal to 0.6, the variance of the second variable equal to 0.5, and a covariance of 0.15, which is the conventional way to simulate risk factors together with contour lines of the two-dimensional normal distribution. The extreme events tend to happen independently of each other. Unfortunately, this is not the case with the real world, where rare extreme rises and falls occur in a synchronized manner. This poses a serious problem with the existing risk management models and their inability to assign a proper probability to the latter, thus eliminating the so-called "perfect storm" scenario.

Thus, the normal distribution has at-least two disadvantages when employed for modeling risk factor returns and more generally, financial series returns:

It cannot explain the high probability of extreme losses (profits) of an individual risk factor;

In a portfolio perspective the multivariate normal distribution suggests that extreme events appear independently, which contradicts financial reality.

Despite this problem, there are currently no serious attempts to employ more sophisticated distribution functions for describing the behavior of risk factors. A major reason for the latter is that the computational time for evaluating parameters of a complex distribution function for a great number of risk factors well exceeds the reasonable time limit for performing a risk analysis.

One attempt to solve this problem is the Mercury 1.5 software system developed by the applicant.

Figure 3:
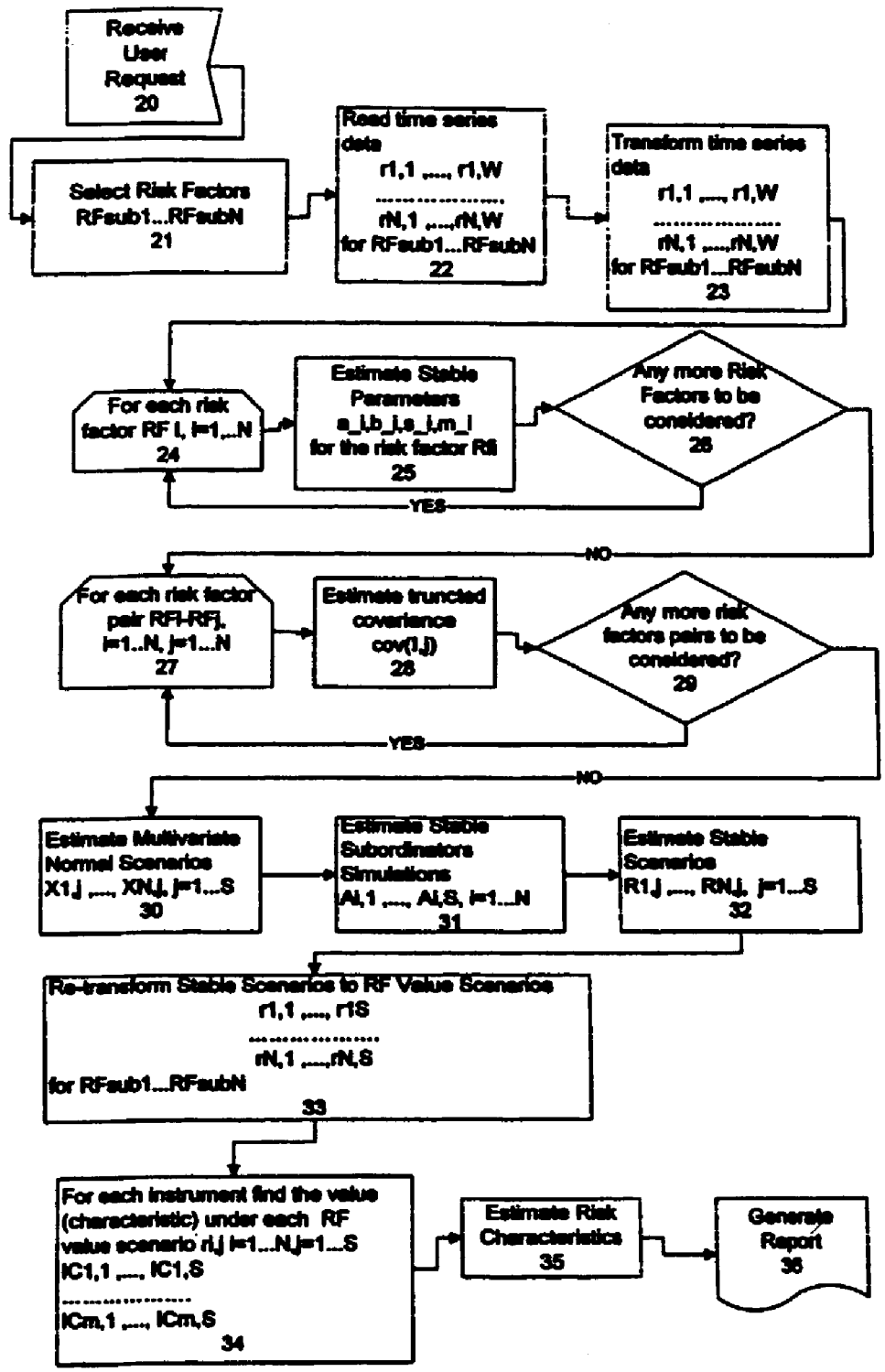
FIG. 3 represents the calculation process of Mercury 1.5 developed by the applicant.

FIG. 3 represents the calculation process of Mercury 1.5 developed by the applicant.

It illustrates the two unavoidable steps that must be accomplished in order to produce risk factor scenarios:

Calculate covariance for each pair of risk factors—illustrated on process blocks 27 through 29;

Calculate stable Paretian parameters for each risk factor—illustrated on process blocks 24 through 26.

Unfortunately, when dealing with thousands of risk factors, even the latter sub-steps take considerable time thus limiting the possibility for in-time risk analysis.

The re-calculation of the parameters each time a risk analysis is performed poses at least two limitations on the Mercury 1.5 system. First—for a risk manager, it is crucial that various types of stress tests are performed in order the sources of the potential losses to be identified and appropriate actions undertaken. For example, a major source of loss is the changing variability of asset returns. The latter finds its vent in both variances and stable Paretian parameters (the stability index and scale parameter). The above-mentioned feature of the system prevents the user from applying pre-defined stress-test values for the risk factor parameters. That limits the practical application and effectiveness of the system. The same problem occurs with some other intermediate results from the calculation process illustrated in FIG. 3. Second—the re-calculation of the parameters each time a risk analysis is performed does not allow for effective risk management at enterprise level. It is very to common for different sub-portfolios of a bank to depend on identical risk factors. A system like the one illustrated on FIG. 3 cannot take advantage of the above fact.

Regarding the modeling technique for the risk factors, Mercury 1.5 models risk factors returns R1, . . . Rn as a component-wise product of a multivariate normal vector (X1, . . . , Xn) with an independent vector of independent stable subordinators (A1, . . . , An). Thus, the generation of risk factors returns' scenarios is performed through sampling random numbers from the multivariate normal distribution and multiplying them by stable subordinator simulations. An additional stable Paretian random number with a skewness parameter equal to beta multiplied by two is added to each simulation in order to obtain skewed simulations for a given risk factor with a skewness parameter beta, if needed. The covariance matrix of the multivariate normal vector X=(X1, . . . , Xn) is estimated based on the empirical observations of the risk factor returns where the extreme events are truncated. The stable subordinator parameters for the i-th component are set to:

alpha_i divided by two for the stability index, one for the skewness parameter, the latter two statements being properties of the stable subordinators, zero for mu, $$c_i = \frac{\sigma_i^{*2}}{\sigma_i^2}\left[\cos\left(\frac{\pi\alpha_i}{4}\right)\right]^{\frac{2}{\alpha_i}}$$

for the scale parameter, where alpha_i is the estimated stability index of the returns of the i-th risk factor, sigma*_i is the estimated scale parameter of the i-th risk factor and sigma_i is the standard deviation of the i-th component of the vector X.

Mercury 1.5 makes an important improvement over usual Risk Management Systems, since it provides greater flexibility in modeling marginal distributions of financial variables (risk factors) by employing stable Paretian distributional family.

Figure 4:
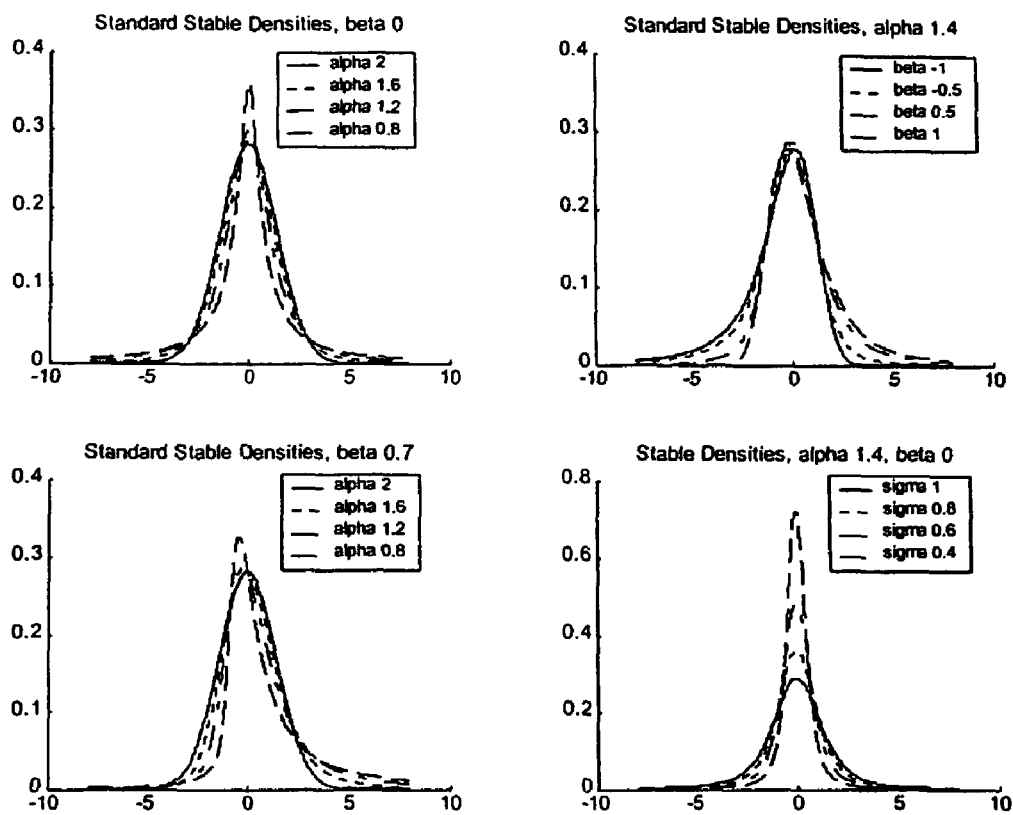
FIG. 4 shows a number of probability densities under the stable Paretian distributional family.

FIG. 4 shows a number of probability densities under the stable Paretian distributional family. They provide a much more flexible approach that allows for different degrees of heavy-tailedness and asymmetry of the data. The Stable Paretian distributional family is characterized by four parameters (usually referred to as alpha, beta, sigma and mu) instead of the traditional two parameters in the normal case. Sigma and mu are the scale and shift parameters and are similar to the standard deviation and the mean of the normal distribution. The additional two stable Paretian parameters alpha and beta control the degree of heavy-tailedness and the asymmetry of the data, respectively. The parameter alpha is greater than zero and less or equal to two. For alpha equal to two and beta equal to zero, a normal distribution is obtained as a special case. Thus the normal distribution presents a special case of Stable distributions.

Choosing stable Paretian (non-Gaussian) distribution instead of the normal distribution for describing marginal distributions of risk factors is not without a background.

The work builds upon Benoit Mandelbrot's fundamental work in the 1960s, which strongly rejected normality as a distributional model for asset returns. Examining various time series on commodity returns and interest rates, he conjectured that financial return processes behave like non-Gaussian stable processes. To distinguish between Gaussian and non-Gaussian stable distributions, the latter are often referred to as "stable Paretian," emphasizing the fact that the tails of the non-Gaussian stable density have Pareto power-type decay, or "Lévy stable," due to the seminal work of Paul Lévy introducing and characterizing the class of non-Gaussian stable laws.

Mandelbrot's early investigations on asset returns were carried further by Eugene Fama and Richard Roll, among others, and led a consolidation of the Stable Paretian Hypothesis. After the 1970s, various alternatives to the stable law have been proposed in the literature. Among the candidates considered were, for example, fat-tailed distributions being only in the domain of attraction of a stable Paretian law, finite mixtures of normal distributions, the Student t-distribution, or the hyperbolic distribution.

Major drawbacks of all these alternative models are their lack of stability and the fact that they are not a limiting distribution in the Central Limit Theorem.

An attractive feature of the stable models—not shared by other distributional models—is that they allow us to generalize Gaussian-based financial theories and, thus, to build a coherent and more general framework for financial modeling. The generalizations are only possible because of the specific probabilistic properties that are unique to (Gaussian and non-Gaussian) stable laws, namely, the stability property, the Central Limit Theorem, and the Invariance Principle for Lévy-stable processes.

For clarity we provide the characteristic functions of the traditional normal and the stable Paretian (non-Gaussian) distributions.

The characteristic function of a normal random variable is:

$$\Phi_R(\theta) = E(\exp(iR\theta)) = \exp\left\{-\frac{\sigma^2}{2}\theta^2 + i\mu\theta\right\}$$

where $\mu$ is the mean and $\sigma$ is the standard deviation.

The characteristic function of a stable Paretian (non-Gaussian) random variable is:

$$\Phi_R(\theta) = E(\exp(iR\theta)) = \exp\left\{-\sigma^\alpha|\theta|^\alpha\left(1 - i\beta(sgn\theta)\tan\frac{\pi\alpha}{2}\right) + i\mu\theta\right\}, \text{ if } \alpha \neq 1$$

$$\Phi_R(\theta) = E(\exp(iR\theta)) = \exp\left\{-\sigma|\theta|\left(1 + i\beta\frac{2}{\pi}(sgn\theta)\ln\theta\right) + i\mu\theta\right\}, \text{ if } \alpha = 1$$

where $\alpha$ is the index of stability, $0<\alpha\leq 2$, $\beta$ is the skewness parameter, $-1\leq\beta\leq 1$, $\sigma$ is the scale parameter, $\sigma\geq 0$, and $\mu$ is the location parameter $\mu\in\Re$.

The discussion above makes clear that stable Paretian distributions provide much more flexible and realistic approach to model the distribution of a given risk factor.

However, there are certain problems associated with the modeling technique of risk factors within Mercury 1.5.

The first problem comes from the fact that stable Paretian distributions do not obtain closed-form density functions. Thus, time-consuming numerical procedures are employed to accurately estimate stable Paretian parameters of a given risk factor. The latter causes speed performance problems when dealing with thousands of risk factors.

Figure 5:
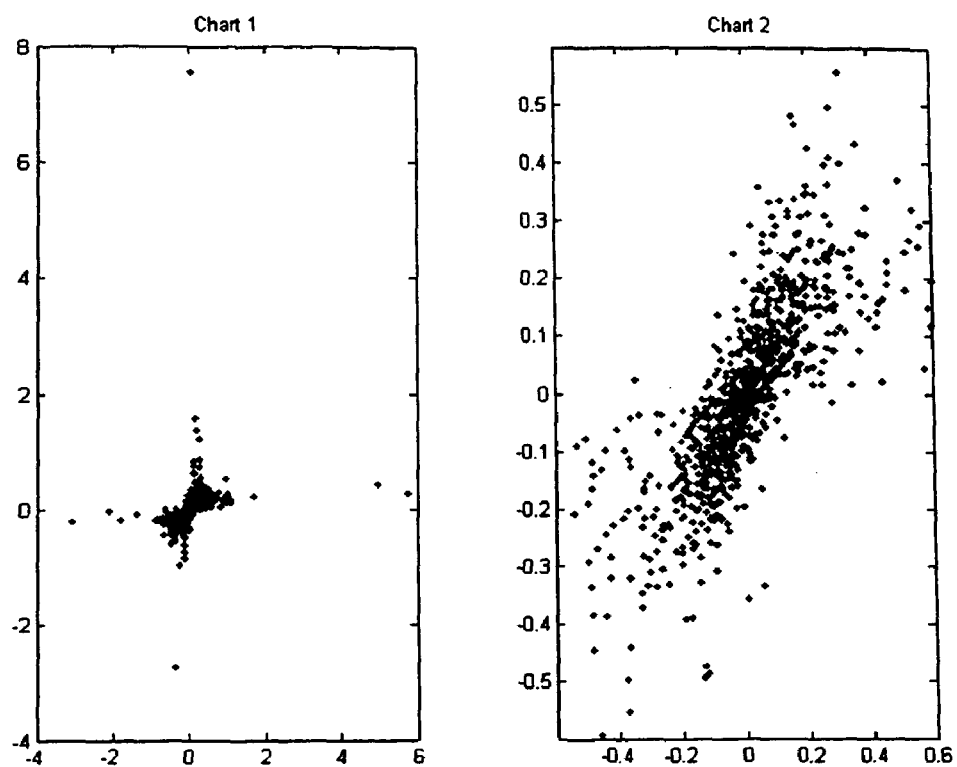
FIG. 5 shows 1000 simulations drawn from a two-dimensional distribution with stable Paretian marginal distributions and with a truncated correlation coefficient of 0.9161 (Mercury 1.5 approach). The stable Paretian parameters of the first variable are alpha 1.5, beta 0, sigma 1, mu 0; the stable Paretian parameters of the second variable are alpha 1.7, beta 0, sigma 1, mu 0.

Yet another disadvantage of the system in FIG. 3 is that the dependence structure is limited to the center of the distribution. As it is illustrated on FIG. 5 showing 1000 simulations drawn from a two-dimensional distribution with stable Paretian marginal distributions and with truncated correlation coefficient of 0.9161, this makes the extreme events move independently, the latter being a unrealistic assumption as noted above.

Thus, the problem is bilateral—how to choose the most appropriate distributional assumption that possesses the necessary flexibility to model financial reality and how to estimate its parameters and generate scenarios in a fast and efficient way?

By the present invention we are providing a system and method that give answer to these two questions and provide new opportunities in accurate and reliable risk management.

Figure 6:
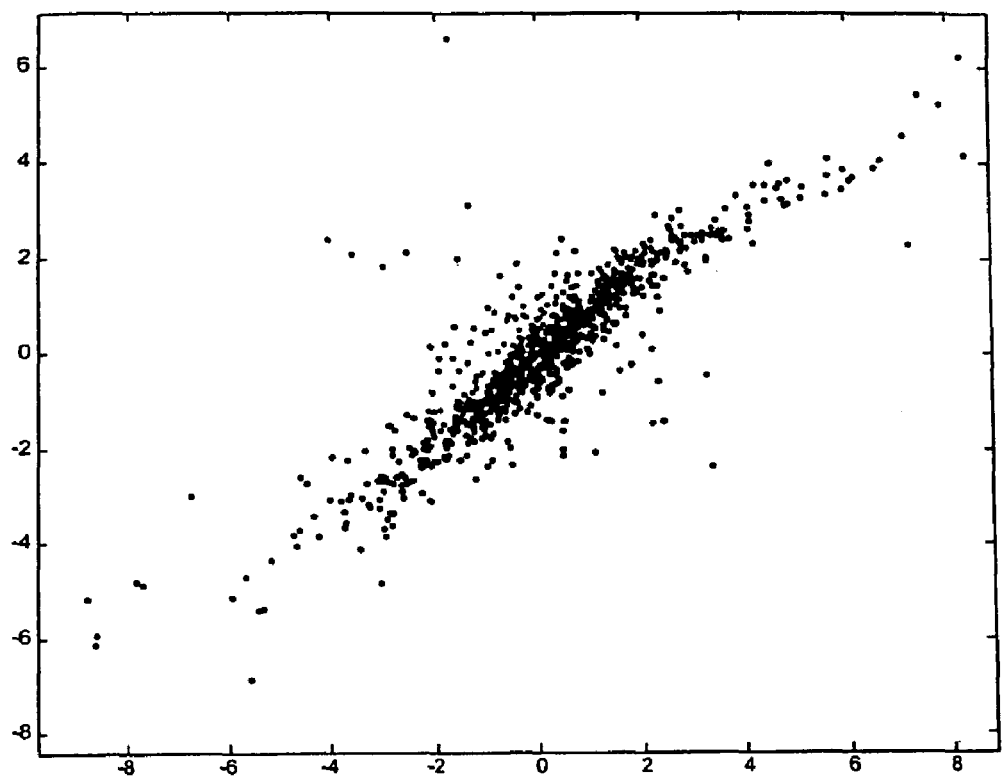
FIG. 6 shows 1000 simulations drawn from a two-dimensional distribution where the marginal distributions are considered to be stable Paretian ones, and the dependency of the two variables is modeled by a t-copula with one degree of freedom and a correlation coefficient of 0.9161. The stable Paretian parameters of the first variable are alpha 1.5, beta 0, sigma 1, mu 0; the stable Paretian parameters of the second variable are alpha 1.7, beta 0, sigma 1, mu 0.
Figure 7:
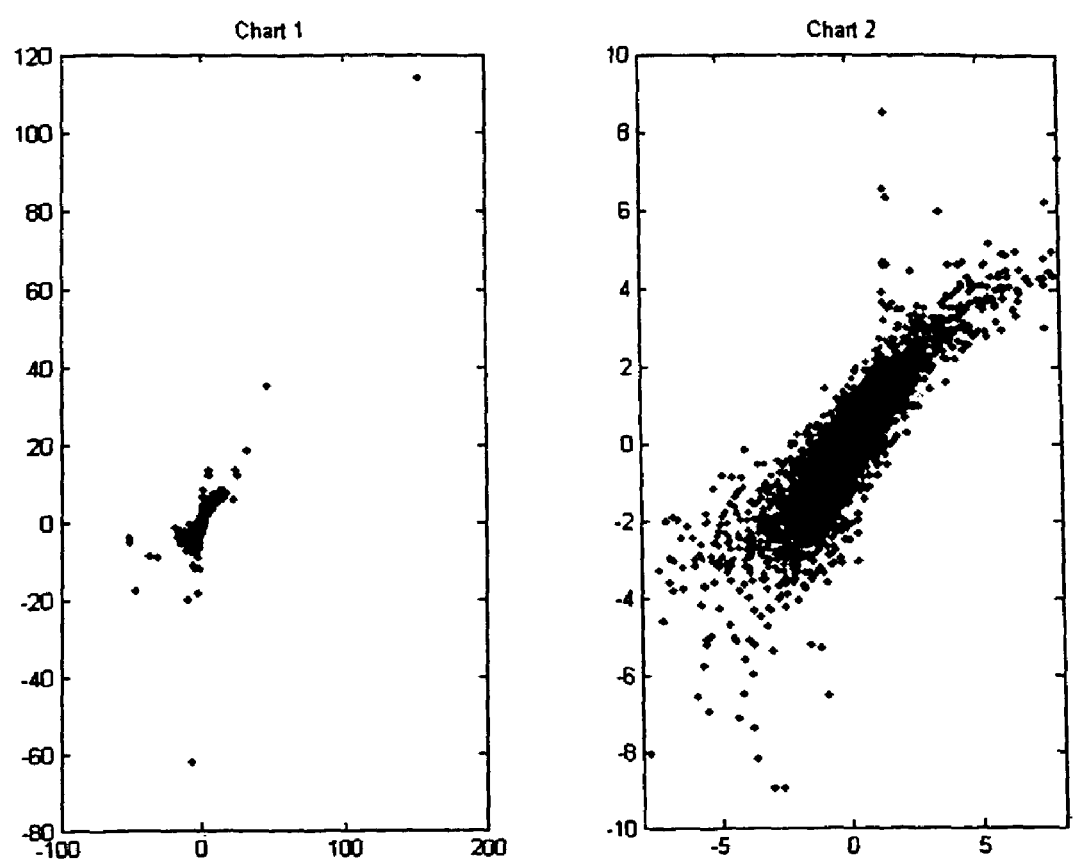
FIG. 7 shows 1000 simulations drawn from a two-dimensional distribution where the marginal distributions are considered to be stable Paretian ones, and the dependency of the two variables is modeled by a Gumbel copula with a parameter equal to four. The stable Paretian parameters of the first variable are alpha 1.5, beta 0, sigma 1, mu 0; the stable Paretian parameters of the second variable are alpha 1.7, beta 0, sigma 1, mu 0.

FIGS. 6 and 7 show 1000 simulations drawn from a two-dimensional distribution where the marginal distributions are considered to be stable Paretian ones; however, the dependency of the two variables is modeled by a t-copula and a Gumbel copula, respectively, instead of using a linear correlation (the t-copula has 1 degree of freedom and correlation coefficient of 0.9161; the parameter of the Gumbel copula is 4). The latter two models are covered by the present invention.

The tails of the marginal distribution have power decay—see also FIG. 4 (coming from the fact that margins are stable Paretian and thus describing the risk of extreme events) and that, in the same time, extreme events tend to appear simultaneously—in the case of t-copula both positive and negative extreme events are dependent; in the case of Gumbel copula only positive extreme events are dependent.

The present invention in one of its aspects provides flexibility in modeling variety of financial data in a qualitatively new way thus better managing the complexity of financial reality.

Certain embodiments of the present invention are described below in greater detail with reference to FIGS. 8 through 16. A simulation is a possible value of a risk factor and a scenario is a joint set of values for a set of risk factors. Thus each scenario can be viewed as a vector of simulations describing the joint movement of risk factors.

As it is shown in greater details below, the present invention obviates or mitigates at-least one of the limitations of the conventional Risk Management Systems by providing a system and method that offer an opportunity to use flexible multivariate distributions exhibiting heavy-tails, skewness and different dependence structures of financial variables;

provide means for flexible stress tests at all levels of the calculation process;

improve efficiency and provide fast analysis due to the possibility intermediate results to be used in a number of subsequent calculations and/or employed by many users;

accelerate performance due to the possibility to perform several calculations in a parallel mode.

Figure 8:
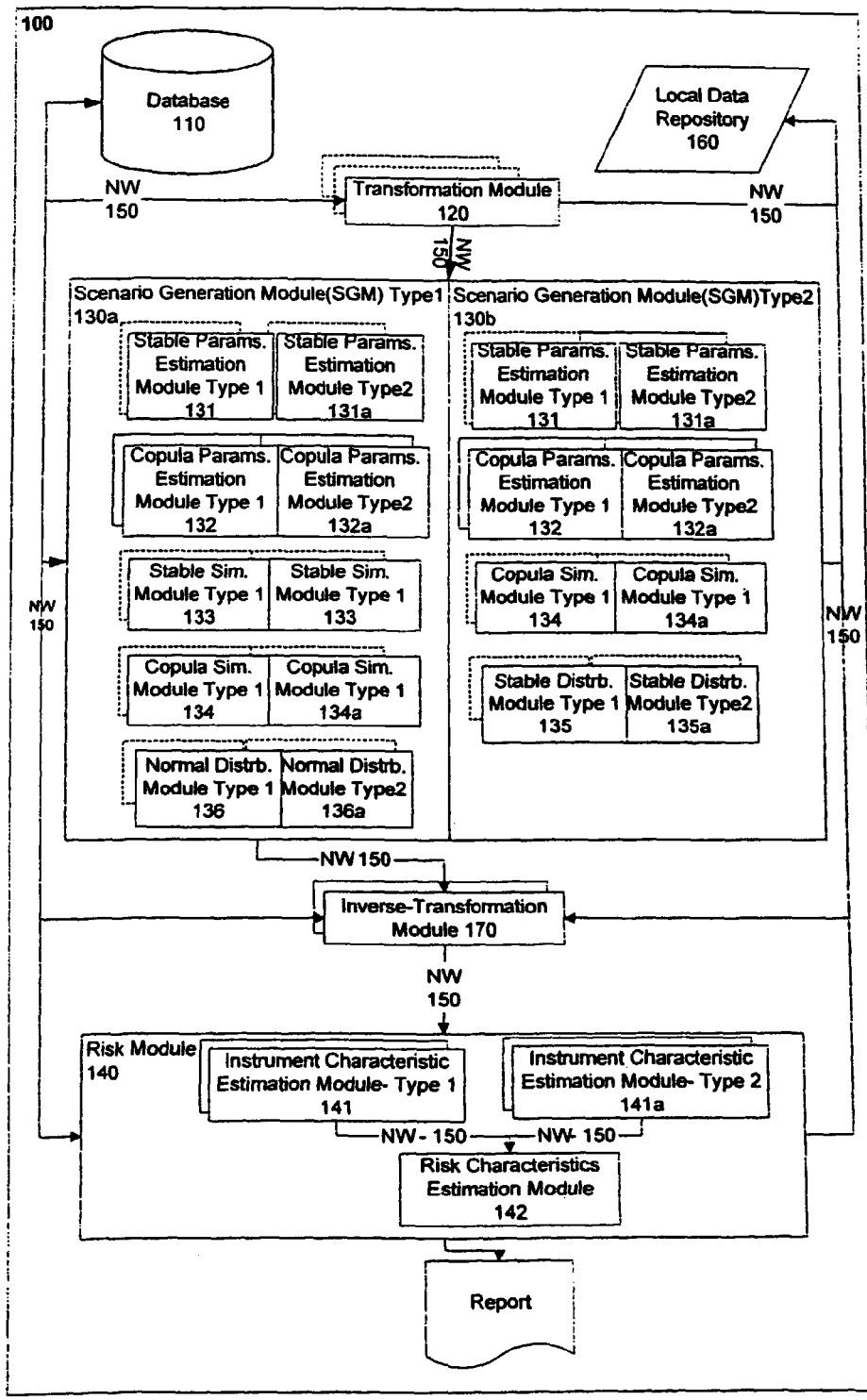
FIG. 8 depicts an embodiment of a Risk System in accordance with the present invention.

On FIG. 8 an embodiment of a Risk System in accordance with the present invention is indicated as 100. Risk management System 100 comprises a Database 110, at least one Transformation Module 120, at least one Scenario Generation Module 130a and/or 130b, at least one Inverse Transformation Module 170 and at least one Risk Module 140. The Scenario Generation Module 130a comprises at least one Stable Parameters Estimation Module 131, at least one Copula Parameters Estimation Module 132, at least one Stable Simulations Module 133, at least one Copula Simulations Module 134, and at least one Normal Distribution Module 136. The Scenario Generation Module 130b comprises at least one Stable Parameters Estimation Module 131, at least one Copula Parameters Estimation Module 132, at least one Copula Simulations Module 134, and at least one Stable Distribution Module 135. The Risk Module 140 comprises at least one Instrument Characteristics Estimation Module 141 and at least one Risk Characteristics Module 142.

Additional types of Stable Parameters Estimation Modules indicated as 131a can be incorporated in the system (for example, to provide different methods of estimating stable Paretian parameters). Additional Stable Parameters Estimation Modules from one type can also be incorporated (for example, to operate on different sub-sets of risk factors). The latter are shown in dashed lines.

The same applies to the Copula Parameters Estimation Modules, Stable Simulations Modules, Copula Simulations Modules, Stable Distribution Modules, and Normal Distribution Modules, additional types of modules indicated as 132a, 133a, 134a, 135a and 136a, respectively, and additional modules from one type shown in dashed lines.

Additional types of Instrument Characteristics Estimation Modules indicated as 141a can be incorporated in the system (for example, to provide different methods of estimation or methods of estimating instrument characteristic for different types of instruments). Additional Instrument Characteristics Estimation Modules from one type can also be incorporated (for example, to operate on different sub-sets of instruments). The latter are shown in dashed lines.

Each of the modules can include a suitable user interface (not shown on the Figure) that allows users to configure and operate with the corresponding module.

Modules communicate with each other and with the Database 110 by appropriate connection means such as Network 150 or can reside in the same system process and can represent classes of functions executable in appropriate order.

The Transformation Module 120 prepares (transforms) a set of risk factor time series observations to the appropriate form (Generally, the goal of the Transformation Module is to transform risk factor time series observations to a stationary, homogeneous time-series.). The risk factor time series observations can be retrieved from the Database 110 using the appropriate connection means or from the Local Data Repository indicated as 160. One embodiment of the Transformation Module as a part of the present invention can be a module that simply transforms risk factor values to risk factor log-returns for a given horizon. That will usually be the case if the Risk Management System is used to estimate short-term risk characteristics of a set of instruments as in the case with the widely used Value-at-Risk risk analysis. Yet another embodiment of the Transformation Module as a part of the present invention can be a module that applies a given time-series model over the risk factor historical observations and estimates the corresponding residuals. This embodiment of the Transformation Module will be useful when the Risk System is employed to estimate long-term risk characteristics such as Credit Value-at-Risk and Portfolio Optimal Allocation.

The Scenario Generation Modules 130a and 130b receive the transformed data for the risk factors from the Transformation Module 120 by appropriate connection means such as Network 150 and generates stable Paretian scenarios (dependent stable Paretian simulations) for the transformation of the risk factor data. The parameters needed for performing the scenario generation can be retrieved from the Database 110 or from the Local Data Repository 160, or estimated by the Copula Parameters Estimation Module 132 and Stable Parameters Estimation Module 131. In the latter case, the estimation of the stable Paretian parameters can be accomplished in a parallel way by the initialization of at least two Stable Parameters Calculation Modules 131, the additional ones shown in dashed lines.

The copula parameters estimation can also be performed in a parallel way by the initialization of at least two Copula Parameters Calculation Modules 132 and the additional ones shown in dashed lines, if the mathematical model of the particular copula type permits that (for example—Gaussian copulas).

The generation of the necessary simulations (random variables) can by performed in a parallel way by initializing at least two appropriate simulation modules (for copula simulation—Copula Simulations Module 134 and additional ones shown in dashed lines, and for stable Paretian simulations—Stable Simulations Module 133 and additional ones shown in dashed lines).

A conversion of a given simulation, or more generally a realization of a random variable (which might be an appropriately transformed historical observation of a given risk factor), from a uniform distribution to a stable Paretian distribution and vice versa is performed by the Stable Distribution Module 135.

The Normal Distribution Module 136 receives a set of simulations drawn from a uniform distribution and converts them to a normal distribution or vice versa.

Several Stable Distribution Modules 135 (additional ones shown in dashed lines) and/or Normal Distribution Modules 136 (additional ones shown in dashed lines) can be initialized simultaneously to work on different sub-sets of simulations (realizations of random variables) and/or sub-sets of risk factors.

The results from the Copula Parameters Estimation Modules 132, Stable Parameters Estimation Modules 131, Copula Simulation Modules 134, and Stable Simulation Modules 133 are optionally stored in the Database 110 or the Local Data Repository 160 in a suitable format using appropriate communication means such as Network 150.

FIG. 9 illustrates a structure of the Database 110 in one embodiment of the present invention.

As it is shown, the first table of the Database 110 is arranged as a two-dimensional data structure with one axis representing the risk factors (illustrated as the horizontal axis) and the other axis representing parameters and scenarios (illustrated as the vertical axis). In this portion of Database 110 shown in FIG. 10, the first four rows are reserved for storing stable Paretian parameters; the remaining rows of the table stores simulated values for each risk factor (scenarios). It is possible to store simultaneously copula simulations, subordinator simulations, stable Paretian simulations and the final risk factor value simulations for all risk factors or for a sub-set of them (as illustrated for risk factors RF1 and RFN). Also, it is possible not to keep some of the types of simulations for a given risk factor or for a sub-set of risk factors, or for all of them. For example, it is illustrated that for risk factor RFi stable subordinators' simulations and stable Paretian simulations are not stored, but only the copula simulations and the final risk factor value simulations are stored; for the risk factor RFi+2 only the final risk factor value simulations are stored.

The Database 110 stores a set of such tables, each of them storing the corresponding data for different settings of the calculation. In one embodiment the settings comprise:
  Evaluation date;
  Time window W of historical observations used;

Type of the copula used;
Type of the Transformation Module employed.

It is contemplated that appropriate parts of the data within one table can be updated or added, based on the calculation results from multiple calculations with matching settings.

The set of tables 2, 3, and 4 shown on FIG. 9 illustrate one embodiment of a database structure storing copula parameters. The database structure comprises a square table for storing correlation or covariance parameters between a set of risk factors and a list for storing additional parameters. It might be the case when the additional list of parameters is empty as illustrated on Table 4. This is the case when normal copula family is used. It is also possible to have an empty matrix and only a list of parameters, as illustrated on Table 3. This will be the case for Archimedean copulas, for example.

The Database 110 stores a set of such tables, each of them storing the corresponding data for different settings of the calculation. In one embodiment the settings comprise:
Evaluation date;
Time window W of historical observations used;
Type of the copula;
Type of the Transformation Module employed.

Further on, the Database 110 can store additional information relating to risk characteristic estimation process. For example, FIG. 10 shows the contents of the Database 110 wherein different tree-structure representations are stored for a set of risk factors. Generally, it is helpful for the user to define different tree structures where the risk factors are assigned to appropriate groups in order to perform a convenient and useful risk analysis meeting his particular needs/expectations (two tree structures are depicted on FIG. 10). For example, the user might split risk factors in groups showing the source of risk they are yielding—interest rates, volatilities, exchange rates, etc., or he might choose to represent risk factors in groups showing their regional distributions—all risk factors connected to Asian markets can be in one group, those connected to European markets in another, etc. Such representation then helps analyzing where risk exposures arise from. One embodiment of a database storing such tree representations is shown in the table on FIG. 10.

Returning to FIG. 8 the Inverse Transformation Module 170 receives the generated stable Paretian scenarios from the Scenario Generation Modules 130a or 130b or retrieves them from the Database 110 or the Local Data Repository 160 by appropriate connection means such as Network 150 and transforms them to risk factor value scenarios. That can be performed by applying the inverse transformation of the one employed in the Transformation Module 120.

The Risk Module 140 receives the generated risk factor value scenarios form the Inverse Transformation Module 170 or retrieves them from the Database 110 or the Local Data Repository 160 by appropriate connection means such as Network 150. At least one Instrument Characteristics Estimation Module 141 is initialized to find the instrument characteristics of each instrument from a set of instruments under each of the risk factor value scenarios.

Several Instrument Characteristics Estimation Modules 141 (additional ones shown in dashed lines) can be initialized simultaneously to work on different sub-sets of the risk factor value scenarios.

Additional types of Instrument Characteristics Estimation Modules indicated as 141a can also be initialized, if appropriate.

One embodiment of the Instrument Characteristics Estimation Module 141 is simply the estimation of the value of an instrument under a given scenario value for the risk factors affecting the price of the instrument. That is the case if the Value-at-Risk characteristic is estimated by the system or if the system is required to perform portfolio optimization.

In the case of credit risk analysis the Instrument Characteristics Estimation Module 141 could aim at estimating future exposures arising from each instrument in the set.

The obtained instrument characteristics under each risk factor value scenario are transferred to the Risk Characteristics Estimation Module 142 by appropriate connection means such as network 150. The Risk Characteristics Estimation Module 142 estimates the required risk characteristics.

The final as well as some of the intermediate results are reported to the user in a suitable report format.

Figure 11:
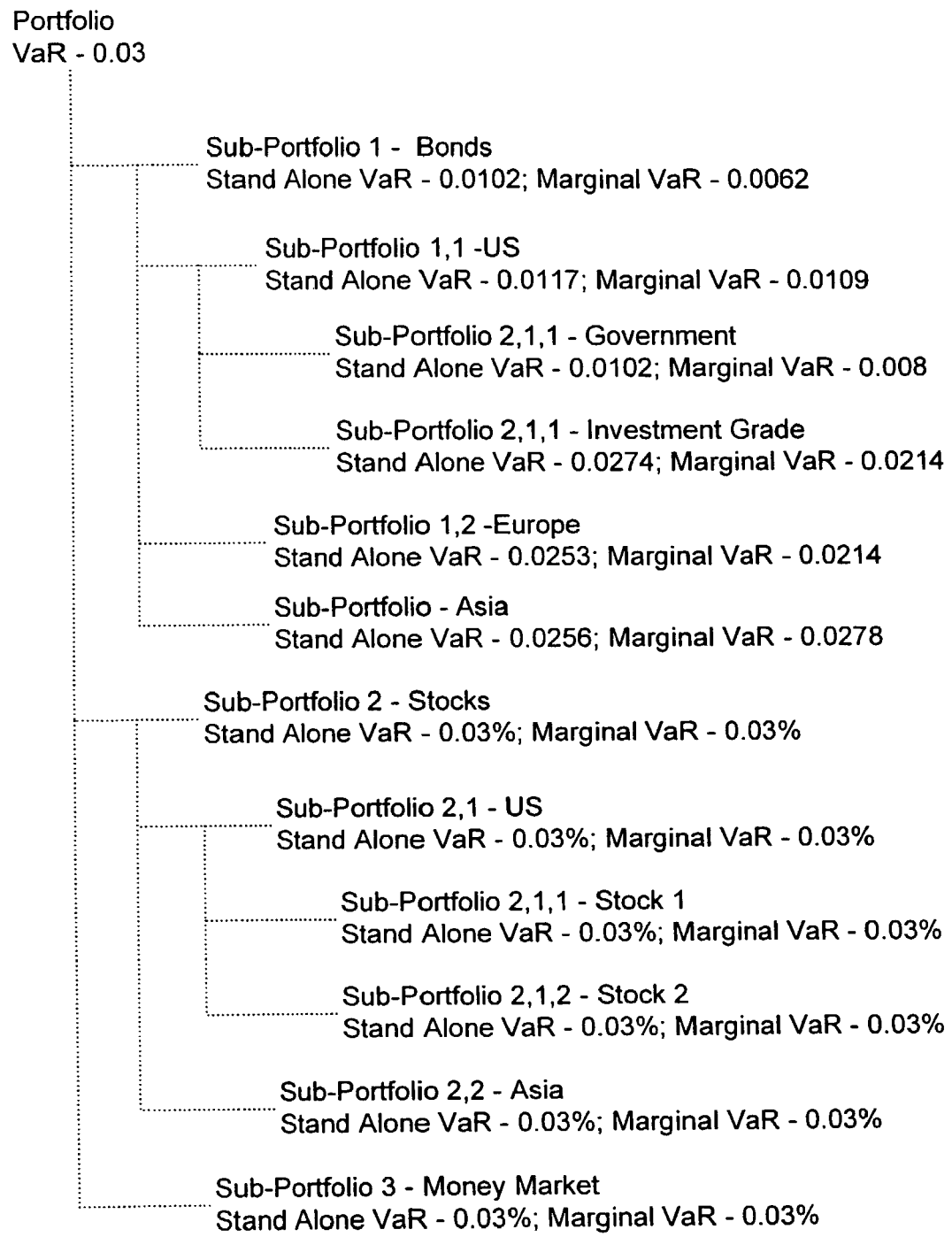
FIG. 11 represents one embodiment of report according to the present invention.

FIG. 11 shows one embodiment of report according to the present invention. One embodiment of such report is illustrated on FIG. 11. As shown on FIG. 11, it is possible to represent a portfolio as a tree of instruments, with the leaf nodes representing the instruments, or other sets of instruments, and the intermediate nodes representing various groupings (sub-portfolios) and arrangements of the leaf nodes. The report shown on FIG. 11 presents a chosen risk characteristic (in this example, Value-at-Risk) for the entire portfolio as well as the stand-alone and marginal risk characteristics of the sub-portfolios and individual instruments.

Such a report helps, for example, identify diversification opportunities and the appropriate trades to reduce the risk of the portfolio.

Some intermediate results (for example, a report showing the estimated stable Paretian scenarios for a set of risk factors or the estimated copula parameters, or the estimated stable Paretian parameters, etc) can be reported as well. Such reports can help identifying useful stress tests that should be performed in order to examine the risk in an extraordinary market situation.

In order to start a risk analysis, a Risk Management System like the one indicated as 100 must receive a user request.

One embodiment of the user request comprises:
1. General Settings;
1.1. Evaluation Date—defines the date for which the analysis must be performed;
1.2. Base Currency—defines the currency in which the values of all assets must be priced; usually this is the domestic currency of the user;
1.3. Risk Hierarchy and Node of the Risk Hierarchy—defines the set of risk factors to be included in the analysis;
1.4. Portfolio and Node (sub-portfolio)—defines the set of instruments and the corresponding quantities;
1.5. Set of Retention Periods (Horizon of the risk analysis);
1.6. Set of Confidence Levels of Risk Characteristics;
1.7. Time Window—defines the number of risk factor value historical observations to be used in the analysis;
1.8. Set of pre-defined instrument characteristics to be analyzed;
1.9. Indicator for using already estimated stable Paretian scenarios matrix
1.9.1. Number of Simulations;
1.9.2. Method of Simulations—defines the method and the corresponding type of the Stable Scenario Generation Module to be employed;
2. Copula-Related Settings;
2.1. Indicator for using already estimated copula scenarios;
2.1.1. Type of the copula;
2.1.2. Indicator for using already estimated copula parameters;
2.1.2.1. Type of the estimation—defines the method and the corresponding type of the Copula Parameters Estimation Module to be employed;

3. Stable-Related Settings;
   3.1. Indicator for using already estimated stable Paretian parameters;
      3.1.1. Type of the estimation—defines the method and the corresponding type of the Stable Parameters Estimation Module to be employed);
   3.1.2. Indicator for using already estimated stable subordinator scenarios;
      3.1.2.1. Type of the estimation—defines the method and the corresponding type of the Stable Simulations Module to be employed.

In another embodiment of the present invention, wherein the Risk Management System 100 is employed for a Credit Risk Analysis, the additional settings may comprise:
- transition probability matrix for each credit segment of instruments. The matrix is retrieved from the Database 110 or from the Local Data Repository 160;
- recovery rates for each credit segment of instruments. The rates are retrieved from the Database 110 or from the Local Data Repository 160.

In yet another embodiment of the present invention, wherein the Risk Management System 100 is employed for Portfolio Optimization, the additional settings may comprise:
- set of Time horizons determining the steps in the portfolio optimization process; these are points of time at which decisions can be made;
- number of scenarios for each step;
- risk characteristic constraints;
- set of additional constraints such as maximum weight of a given instrument in the portfolio.

Suitable sub-sets of settings may not be initialized at user's request, but alternatively, the user can configure the settings for each module separately.

Figure 12:
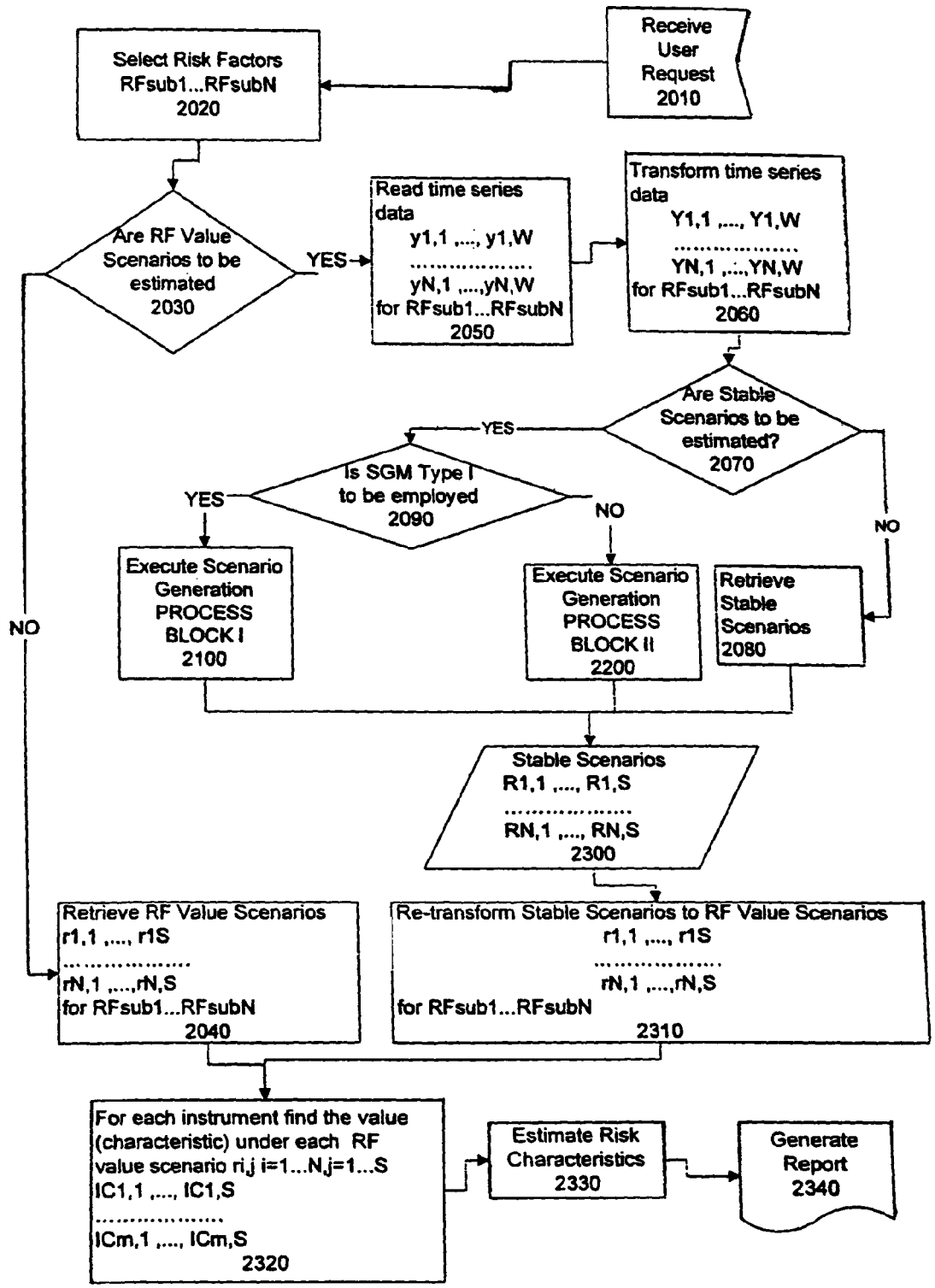
FIG. 12 shows a flowchart representing a process of determining risk characteristics in accordance with the present invention.

FIG. 12 shows a flowchart representing a process of determining risk characteristics in accordance with the present invention.

At step 2010, a user request to start a predefined risk analysis is received by the Risk Management System.

Figure 14:
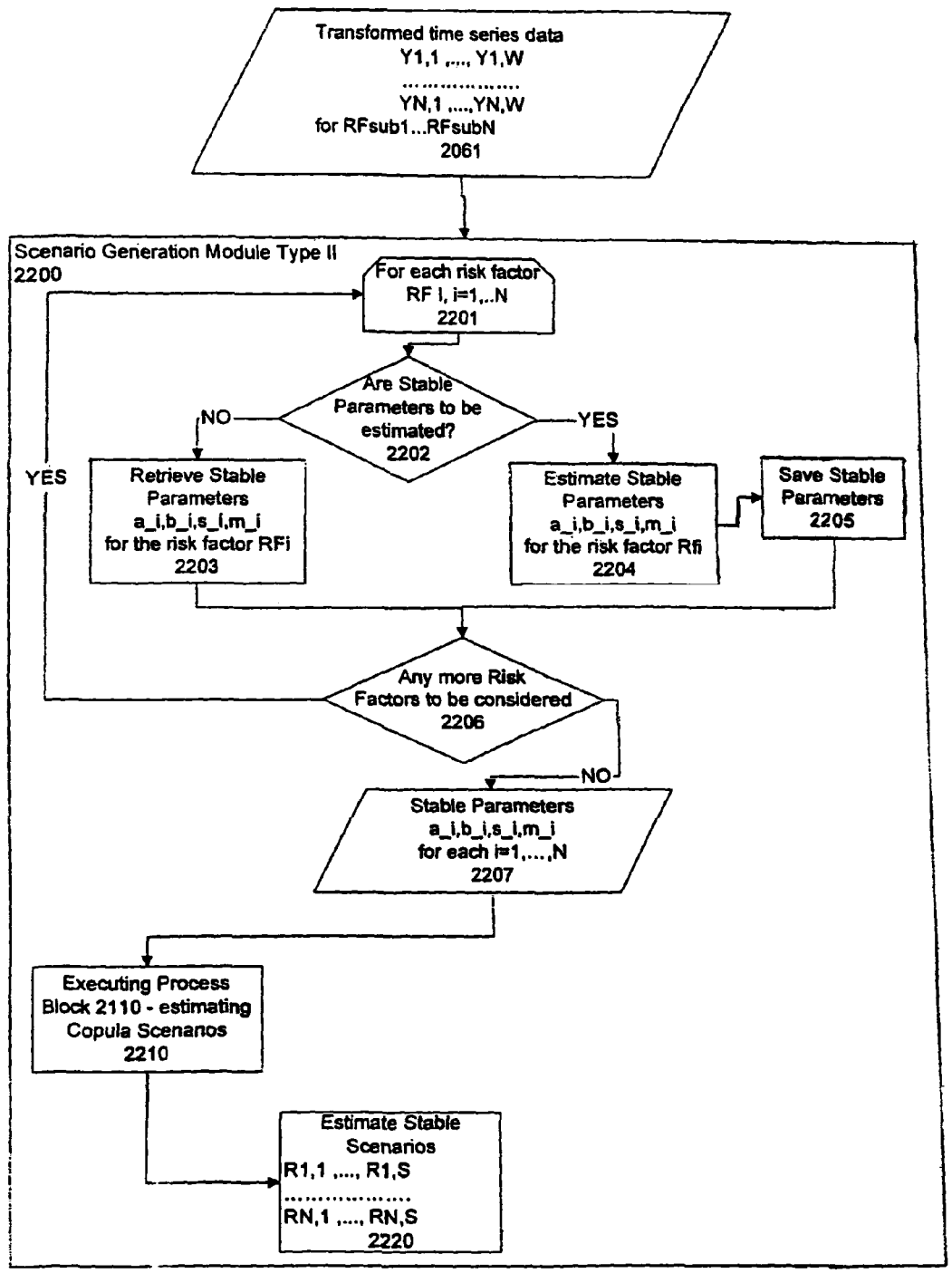
FIG. 14 shows a flowchart representing a process of determining risk factor scenarios according to the second model of the present invention.

The following discussion based on FIG. 14 assumes for clarity and simplicity that only a single time horizon is considered.

The set of N risk factors, RF1, . . . , RFN, for which scenario generation will be performed, is determined at process block 2020. The latter can be accomplished automatically, based on evaluation models for each of the instruments selected by the user, or can represent a part of the user's request.

At decision block 2030, it is determined whether the Risk Factor Value Scenarios will be estimated or must be retrieved from the Database 110 or from the Local Data Repository 160.

Each of the decision blocks described below, the decision whether the simulations (scenarios), respectively parameters are going to be read or estimated, can be taken in at least two ways:
- by an automated process that simply checks whether the simulations, respectively parameters for the settings specified in the user's request for the risk factors chosen in step 2020 are available in the Database 110 or the Local Data Repository 160;
- by referring to an indicator set in the user's request.

The decision at decision block 2030 conveys the process-to-process block 2040 in case the data is retrieved from the Database 110 or from the Local Data Repository 160, and to process block 2050 if risk factor value scenarios will be estimated.

At process block 2050 the risk factor historical observations $y_{i,1}, \ldots, y_{i,w}$ for $i=1 \ldots N$ are read.

Then at process block 2060 the risk factor historical observations $Y_{i,1}, \ldots, YR_{i,w}$ for $i=1 \ldots N$ are transformed to the appropriate form $r_{i,1}, \ldots, r_{i,w}$ for $i=1 \ldots N$ by means of at least one Transformation Module.

Further on, at decision block 2070 it is determined whether Stable Paretian Scenarios will be estimated or must be retrieved from the Database 110 or from the Local Data Repository 160. The decision at decision block 2070 transfers the process-to-process block 2080 in case the data is retrieved from the Database 110 or from the Local Data Repository 160, and to decision block 2090 if risk factor stable Paretian scenarios will be estimated.

Further on, at decision block 2090 it is determined which of the Scenario Generation Modules will be employed. Transformed risk factor historical observations $Y_{i}, 1, \ldots, Y_{i,w}$ for $i=1 \ldots N$ are then transferred to the corresponding Scenario Generation Module: in process block 2100 a Stable Scenario Generation Module of Type1 is initialized; at process block 2200 a Stable Scenario Generation Module of Type2 is initialized. Each of them processes received transformed risk factor historical observations $Y_{i,1}, \ldots, Y_{i,w}$ for $i=1 \ldots N$ and provides stable Paretian scenarios $(R_{1,j}, \ldots, R_{N,j})$, $j=1, \ldots, S$ as an output.

Thus being described, the process goes either through process block 2080, or 2100 or 2200, each of the latter three providing the stable Paretian scenarios for the risk factors $(R_{1,j}, \ldots, R_{N,j}), j=1, \ldots, S$ as an intermediate data, indicated on the Figure as intermediate data structure 2300.

The resulting stable Paretian scenarios $(R_{1,j}, \ldots, R_{N,j})$, $j=1, \ldots, S$ are transmitted to the Inverse Transformation Module 170 at process block 2310, where risk factor value scenarios $(r_{1,j}, \ldots, r_{N,j}), j=1, \ldots, S$ are obtained by applying to each of the stable Paretian scenarios $(R_{1,j}, \ldots, R_{N,j}), j=1, \ldots, S$ the transformation inverse to the one performed in process block 2060.

The risk factor value scenarios $(r_{1,j}, \ldots, r_{N,j}), j=1, \ldots, S$ resulting either from process block 2040 or from process block 2310, are then transmitted to process block 2320, where at least one Instrument Characteristics Estimation Module is initialized in order to estimate the necessary instrument characteristics $(IC_{1,j}, \ldots, IC_{m,j})$ for each of the instruments $I_1, \ldots, I_m$, specified by the user, under each risk factor value scenario $(r_{1,j}, \ldots, r_{N,j}), j=1, \ldots, S$. As discussed above, the list of instrument characteristics comprises the value of an instrument, the credit exposure and risk sensitivities such as DELTA, Gamma, etc.

At process block 2330 the final estimation of required risk characteristics is performed, based on the estimated instrument characteristics $(IC_{1,j}, \ldots, IC_{m,j})$ under each risk factor value scenario $(r_{1,j}, \ldots, r_{N,j}), j=1, \ldots, S$.

At process block 2340 a user report is generated in a suitable format. (See FIG. 12 for one embodiment of the report output)

Figure 13:
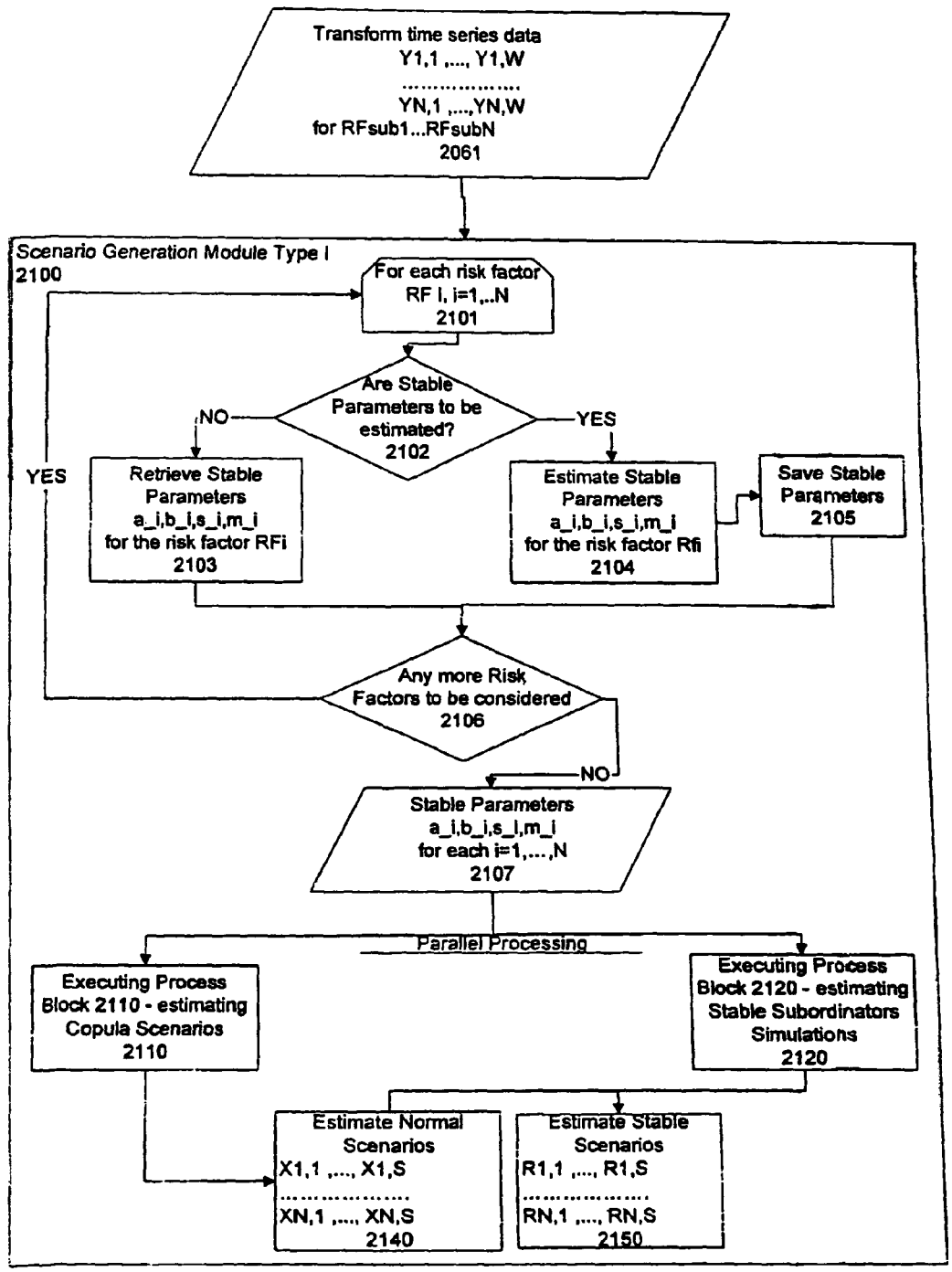
FIG. 13 shows a flowchart representing a process of determining risk factor scenarios according to the first model of the present invention.

Now referring to FIG. 13 and FIG. 14 respectively, we explain process blocks 2100 and 2200 from FIG. 12 in detail.

As indicated on FIG. 13, the process block 2100, representing the process performed by Scenario Generation Module Type1 130, receives the transformed in process block 2060 risk factor historical observations $Y_{i,1}, \ldots, Y_{i,w}$ for $i=1 \ldots N$, indicated on the Figure as the intermediate data structure 2061.

The first step executed in process block 2100 is indicated as a loop operator 2101. For each risk factor $RF_i$, $i=1, \ldots, N$, it transfers the process to decision block 2102 where it is determined whether the stable Paretian parameters for the risk factor $RF_i$ must be retrieved from the Database 110 or from the Local Data Repository 160 or must be estimated.

If the stable Paretian parameters for the risk factor RFi must be retrieved from the Database 110 or from the Local Data Repository 160, the process goes to process block 2103 where the stable Paretian parameters a_i, b_i, s_i and m_i for the i-the risk factor RFi are read; otherwise the process goes to process block 2104 where the stable Paretian parameters a_i, b_i, s_i and m_i for the i-the risk factor RFi are estimated.

Several Stable Parameters Estimation Modules 131-1, ..., **131-*k* can be initialized while performing step 2104**, each of them estimating stable Paretian parameters for different subsets of risk factors.

The process block 2104 is followed by process block 2105 where the estimated stable Paretian parameters a_i, b_i, s_i and m_i for the i-the risk factor Rfi are stored in the Database 110 or in the Local Data Repository 160.

Both the process blocks 2103 and 2105 transfer the process to decision block 2106 where it is determined whether there are more risk factors to be considered (that is, determining whether current i is equal to N). If yes, the process returns to process block 2101, otherwise the stable Paretian parameters are available for all risk factors in the intermediate data structure 2107 and the process is conveyed to process blocks 2110 and 2120 that can be executed either in parallel or in sequence.

Figure 15:
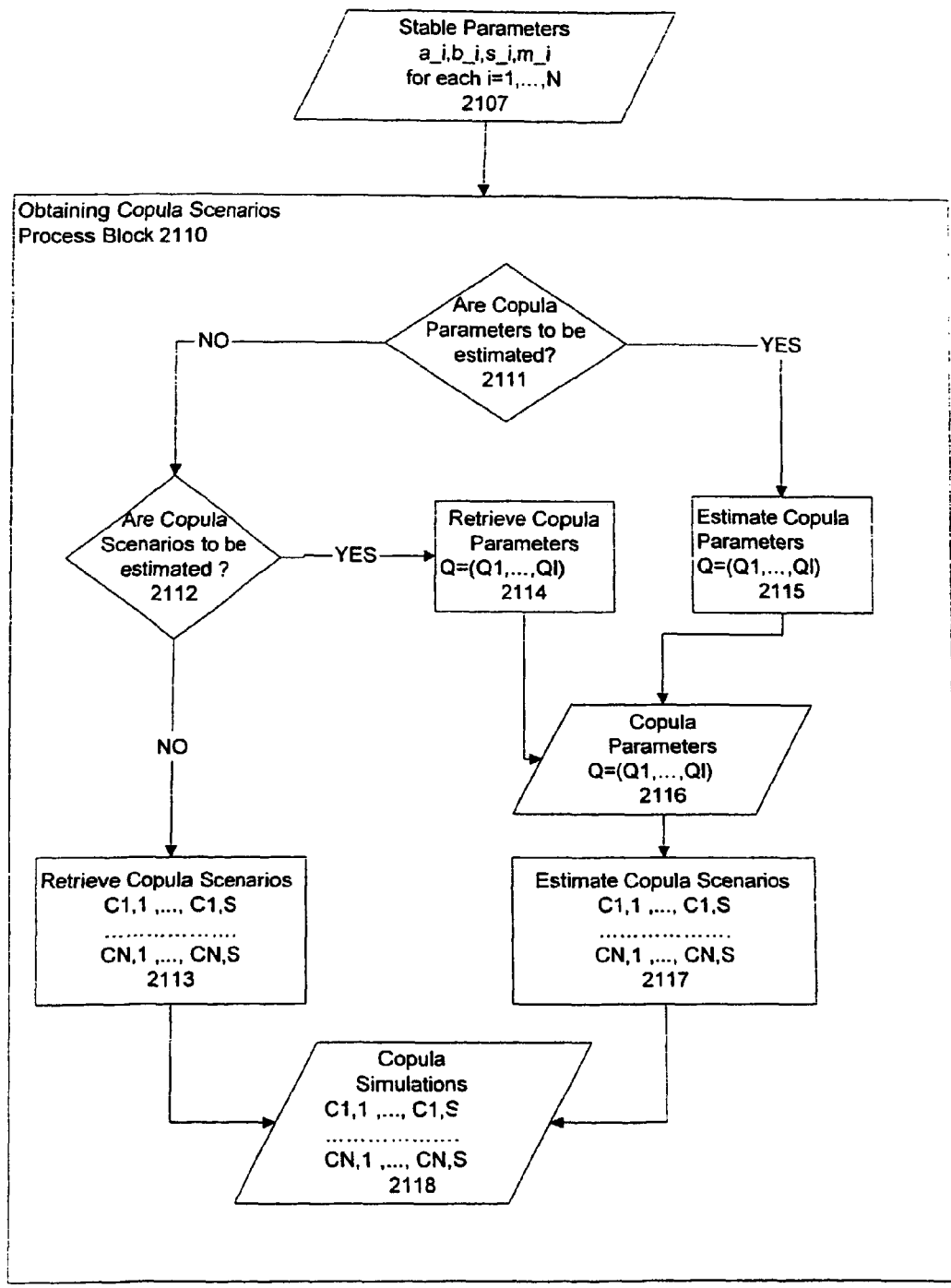
FIG. 15 shows a flowchart representing a process of determining copula scenarios according to the present invention.
Figure 16:
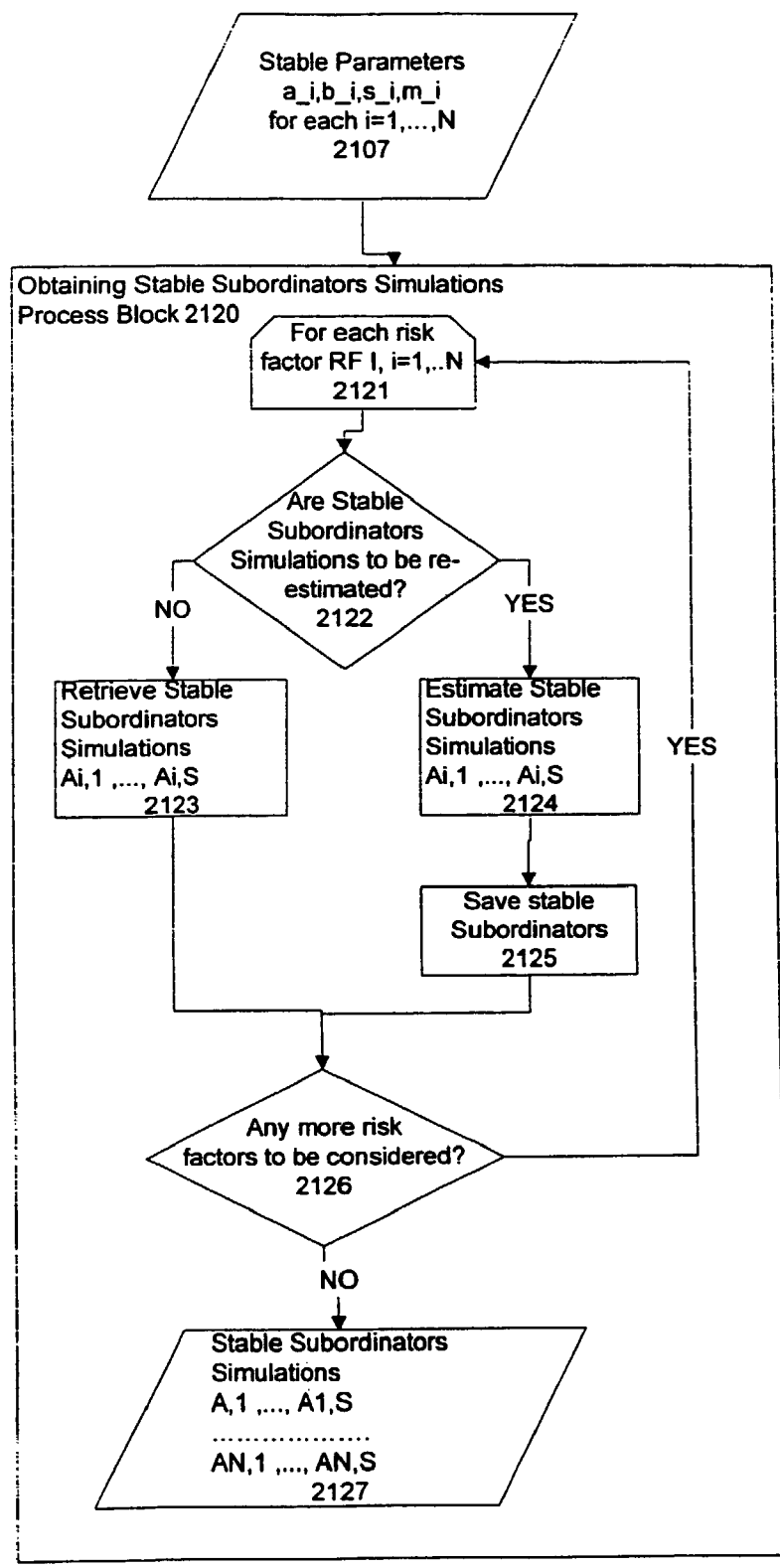
FIG. 16 shows a flowchart representing a process of determining stable subordinator scenarios according to the first model of the present invention.

Copula scenarios are obtained in process block 2110 (see FIG. 15) and stable subordinators simulations are obtained in process block 2120 (see FIG. 16).

After estimating the copula scenarios found in process block 2110, the process goes to process block 2140 where normal scenarios are obtained by means of at least one Normal Distribution Module. More specifically, normal simulations $X_{i,j}$ j=1,... S are found by applying the inverse function of the normal distribution function for each simulation $C_{i,j}$, j=1,... S.

These scenarios $(X1,j, \ldots, XN,j), j=1, \ldots N$ have normal marginal distributions and the dependency is described by the estimated copula.

Having normal scenarios obtained in process block 2140 and stable subordinators' simulations obtained in process block 2120, the stable Paretian scenarios are obtained in process block 2150 by a component-wise multiplication of each component of the normal scenario with the corresponding stable subordinator simulation. More specifically, having the normal scenarios $(X1,j, \ldots, XN,j) j=1, \ldots S$ and stable subordinator simulations $(A1,j, \ldots, AN,j)$ for $j=1, \ldots, S$, the stable Paretian scenarios $(R1,j, \ldots, RN,j) j=1, \ldots S$ are obtained by a component-wise multiplication of a normal scenario $(X1,j, \ldots, XN,j)$ and stable subordinators scenario $(A1,j, \ldots, AN,j)$ for each $j=1, \ldots, S$.

As shown on FIG. 14, the sole difference between the processes performed in process blocks 2100, representing the process performed by Scenario Generation Module Type1 130, and 2200, representing the process performed by Scenario Generation Module Type2 130*a*, lies in the last three steps. Stable subordinators' simulations as well as normal scenarios are not estimated in process block 2200. Instead, after estimating copula scenarios found in process block 2210, the process goes to process block 2220 where stable Paretian scenarios are obtained by the means of at least one Stable Distribution Module that applies inverse stable Paretian distribution function to each component of each of the copula scenarios.

Now referring to FIG. 15 and FIG. 16, respectively, we explain process blocks 2110 and 2210 from FIG. 14, respectively and 2120 from FIG. 13 in detail.

As indicated on FIG. 15, the process block 2110 receives obtained stable Paretian parameters a_i, b_i, s_i and m_I for each risk factor Rfi, I=1, ..., N as an input from the intermediate data structure 2107.

The first step executed in process block 2100 is indicated as a decision block 2111 where it is determined whether copula parameters Q=(Q1, ..., Q1) are going to be estimated.

The decision block 2111 transfers the process to decision block 2112 in case the data is retrieved from the Database 110 or from the Local Data Repository 160, and to process block 2115 if copula parameters will be estimated.

At process block 2115, the copula parameters are estimated by initializing a suitable Copula Parameters Estimation Module. This module generally requires the time series for the risk factors, Yi,1, ..., Yi,W, I=1 ... N, transferred by the Transformation Module 120 as an input, and provides a set of copula parameters Q=(Q1, ..., Q1) needed to model dependency of the time series for the risk factors as a result.

Alternatively copula parameters Q=(Q1, ..., Q1) are obtained in process block 2114 by reading form the Database 110 or from the Local Data Repository 160. This step is executed only if a decision to estimate copula scenarios is taken in decision block 2112.

The result from both the process blocks 2114 and 2115 is that copula parameters Q=(Q1, ..., Q1) are available in the intermediate data structure 2116.

The process then goes to process block 2117 where S copula scenarios (C1,j ..., CN,j) j=1, ... S, are generated. Copula scenarios are estimated by initializing a suitable Copula Simulations Module. Generally, such a module uses the copula parameters Q=(Q1, ..., Q1) as an input and generates the required number S of random vectors (C1, ..., CN) as an output, each of them sampled from the chosen in the user request copula model with parameters Q=(Q1, ..., Q1).

Several Copula Simulations Modules 134-1, ..., **134-*k* can be initialized while executing process block 2117**, each of them operating to produce different sub-sets of scenarios.

If it is decided in decision block 2112 not to estimate copula scenarios, they are retrieved form the Database 110 or from the Local Data Repository 160 at process block 2113.

The intermediate result from process blocks 2113 or 2117 is that copula simulations C1,j ... CN,j. j=1, ... S are available to the system in the intermediate data structure 2118.

These data are then transferred to process block 2140.

As indicated on FIG. 16, the process block 2120 receives obtained stable Paretian parameters a_i, b_i, s_i and m_I for each risk factor RFi, I=1, ..., N as an input from the intermediate data structure 2107.

The first step executed in process block 2120 is indicated as a loop operator 2121. For each risk factor RFi, i=1, ... N, it conveys the process to decision block 2122 where it is determined whether stable subordinator simulations Ai,j j=1, ... S for the risk factor RFi must be retrieved from the Database 110 or from the Local Data Repository 160, or must be estimated.

If the stable subordinator simulations Ai,j j=1, ... S for the risk factor RFi must be retrieved, the process goes to process block 2123 where subordinator simulations Ai,j j=1, ... S for the i-the risk factor Rfi are read; otherwise the process goes to process block 2124 where subordinator simulations Ai,j j=1, ... S for the i-the risk factor Rfi are estimated. Stable subordinator simulations are estimated by initializing a suitable Stable Simulations Module 133. Generally, such a module receives a set of stable parameters and generates the required number of random numbers, each of them sampled from the chosen stable Paretian distribution, as an output.

Several Stable Simulations Modules SM1, . . . , SMl can be initialized while performing step 2124, each of them operating to generate different subsets of stable subordinator simulations.

The process block 2124 is followed by process block 2125 where estimated subordinator simulations Ai,j j=1, . . . S for the i-the risk factor RFi are stored in the Database 110 or in the Local Data Repository 160.

Both the process blocks 2123 and 2125 transfer the process to decision block 2126 where it is determined whether there are more risk factors to be considered (that is determining whether the current i is equal to N). If yes, the process returns to process block 2121; otherwise subordinator simulations Ai,j j=1, . . . S are available for all risk factors RFi, i=1, . . . , N in the intermediate data structure 2127 and the process is transferred to process block 2150 shown on FIG. 14.

A risk system in accordance with the present invention, such as risk system RS, provides a number of advantages over other systems. First, as mentioned above, multiple calculation modules on each layer of the system can be employed in parallel, to process distribution parameter estimation, generate scenarios, and estimate instrument characteristics in a time efficient manner.

Second, since the intermediate results from each calculation can be stored in a Database 110, various useful stress tests can be performed without demanding the entire process recalculated.

Let us suppose, for example, that a portfolio comprising positions in Company A and Company B has been evaluated. Further on, the new market information that company A is going to obtain a significant share in Company B is released. The latter fact is certainly not reflected in the past market data for the companies and this event will change at least the dependency between the stock prices of these two companies. Then a fast and useful stress test can be performed using a Risk Management System such as 100. The user needs to define a stress test where the parameter explaining the dependency (in the simple case—the correlation) between Company A and Company B is assigned a greater value. Since the intermediate results from earlier calculations have been already stored, the system must now only re-simulate a two-dimensional distribution with normal margins and the new copula parameter, and multiply them by the previously simulated stable subordinators.

Another useful example is the identification of marginal risks for the risk factors. If the user wants to identify the marginal risk contributed by the interest rates, for example, he can simply define a "new stress test" where the scenario values of the interest rate risk factors are kept constant, equal to the current market value. Then the only re-calculation needed is in the Risk Module 140. Similarly the user can define stress tests to analyze:

parallel shifts in yield curves, and forward price curves;
yield curve and forward curve twists (changes in the shape of the forward curve);
volatility changes (local changes, volatility curve changes), etc.

Similarly, the present invention allows for an improved risk management on an enterprise level. Risk factor stable Paretian scenario generations (or even risk factor value scenario generations) can be performed on a centralized server and then stored in a centralized Database 110. Subsequently, they can be used in all institution's branches all over the word for examining the specific risk characteristics of various portfolios without any need to independently generate risk factor stable Paretian scenarios (risk factor value scenario generations).

Moreover, the present invention provides for examining risk characteristics of a portfolio changing in structure throughout the trading day, without any need to re-estimate risk factor stable Paretian scenarios (Risk factor value scenario generations) each time a trade occurs.

Further on, the conventional Risk Management Systems are not capable of providing an accurate model of risk and, more specifically, of the risk factors. As mentioned above, the present invention overcomes that limitation by using stable Paretian distributions to model marginal distributions of financial returns and the copula approach to model dependency characteristics.

Now referring to FIGS. 18 through 37 we illustrate the improvement introduced by the present invention, by two more examples.

Let us consider a portfolio of corporate bonds whose risk should be evaluated. In order to estimate, for example, the Value-at-Risk measure for a one-day horizon at any confidence level, we need to first obtain the distribution of the portfolio. The accuracy of the estimated VaR depends on the accuracy of the distribution. In the particular example, risk factors are the risk-free yield curve and the credit spreads. In order to measure the accuracy of the empirical distribution obtained from the generated scenarios we use two statistics—Kolmogorov Distance KD and Anderson-Darling Statistic ADS, the latter two defined as follows:

$$KD = \sup_x |F_e(x) - F_s(x)|,$$

$$AD = \sup_x \left\{ \frac{|F_e(x) - F_s(x)|}{\sqrt{F_e(x)(1 - F_e(x))}} \right\},$$

where Fe(x) is the empirical cumulative density function (cdf) and Fs(x) is the simulated cdf.

The "instruments" used in the example are the Merrill Lynch indices of the US government and corporate bonds with maturities from one to 10 years and credit ratings from "BB" to "AAA". Each index set includes 2418 daily observations from Mar. 13, 1990 to Jul. 29, 1999.

The portfolio is constructed considering equal weights of the instruments.

Figure 17:
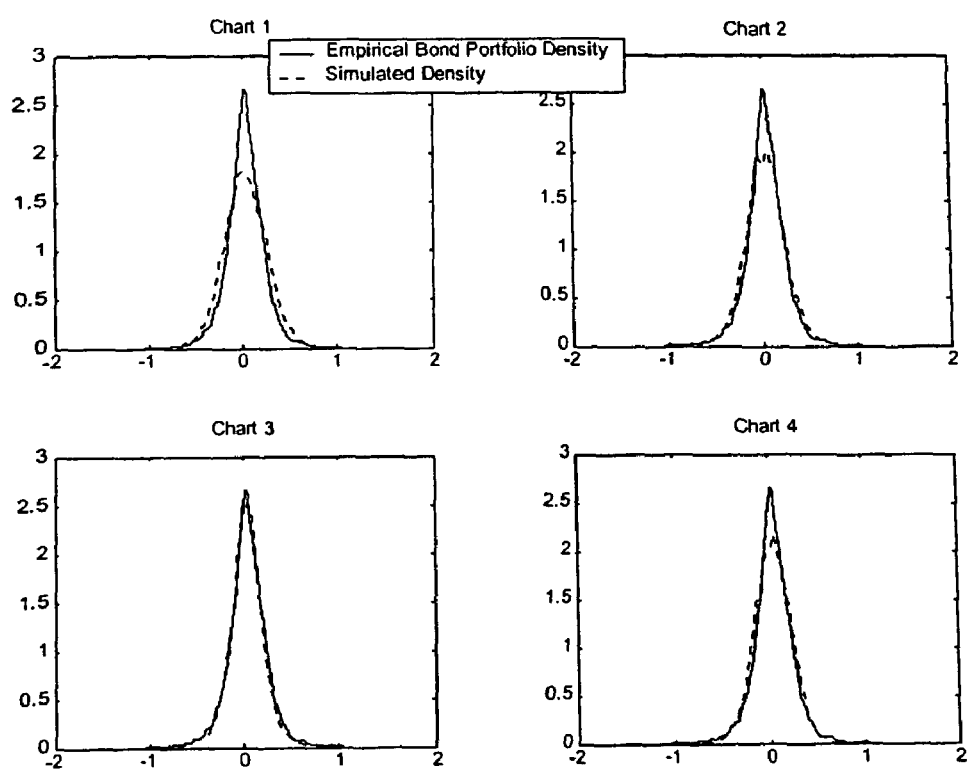
FIG. 17 shows four charts of density functions. In all four charts the solid curve represents the Empirical Density Function of a sample portfolio return, while the dashed line shows the portfolio return density obtained when log-changes of the risk factors are simulated like:
normal random variables with a covariance matrix estimated by the method of moments in the first chart.
stable sub-Gaussian random variables with a "truncated" covariance matrix estimated by the method of moments in the second chart;
stable Paretian random variables and the dependency is modeled using t-copulas in the third chart;
normal random variables and the dependency is modeled using t-copulas in the fourth chart.

Referring to FIG. 17, in all four charts the solid curve represents the Empirical Density Function of the portfolio return with equal weights of the individual indices, while the dashed line shows the portfolio return density obtained when log-changes of the risk factors are simulated like:

normal random variables with a covariance matrix estimated by the method of moments in the first chart;
stable sub-Gaussian random variables with a "truncated" covariance matrix estimated by the method of moments in the second chart;
stable Paretian random variables and the dependency is modeled using t-copulas in the third chart;
normal random variables and the dependency is modeled using t-copulas in the fourth chart.

Figure 18:
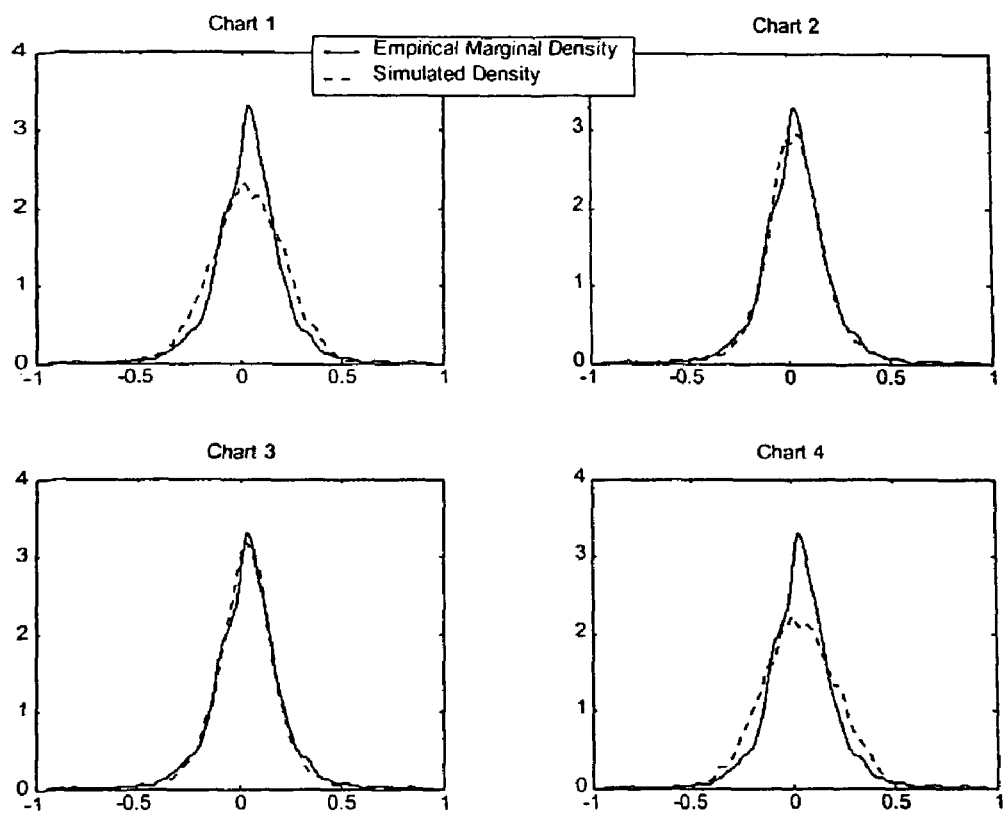
FIG. 18 shows four charts of density functions. In all four charts the solid curve represents the Empirical Density Function of the marginal distribution of BBB—rated bond returns, while the dashed line shows the marginal density of BBB—rated bond returns obtained when log-changes of the risk factors are simulated like:
normal random variables with a covariance matrix estimated by the method of moments in the first chart;
stable sub-Gaussian random variables with a "truncated" covariance matrix estimated by the method of moments in the second chart;
stable Paretian random variables and the dependency is modeled using t-copulas in the third chart;
normal random variables and the dependency is modeled using t-copulas in the fourth chart.

Referring to FIG. 18, in all four charts the solid curve represents the Empirical Density Function of the marginal distribution of BBB—rated bond returns, while the dashed line shows the marginal density of BBB—rated bond returns obtained when log-changes of the risk factors are simulated like:

normal random variables with a covariance matrix estimated by the method of moments in the first chart;

stable sub-Gaussian random variables with a "truncated" covariance matrix estimated by the method of moments in the second chart;

stable Paretian random variables and the dependency is modeled using t-copulas in the third chart;

normal random variables and the dependency is modeled using t-copulas in the fourth chart.

Figure 19:
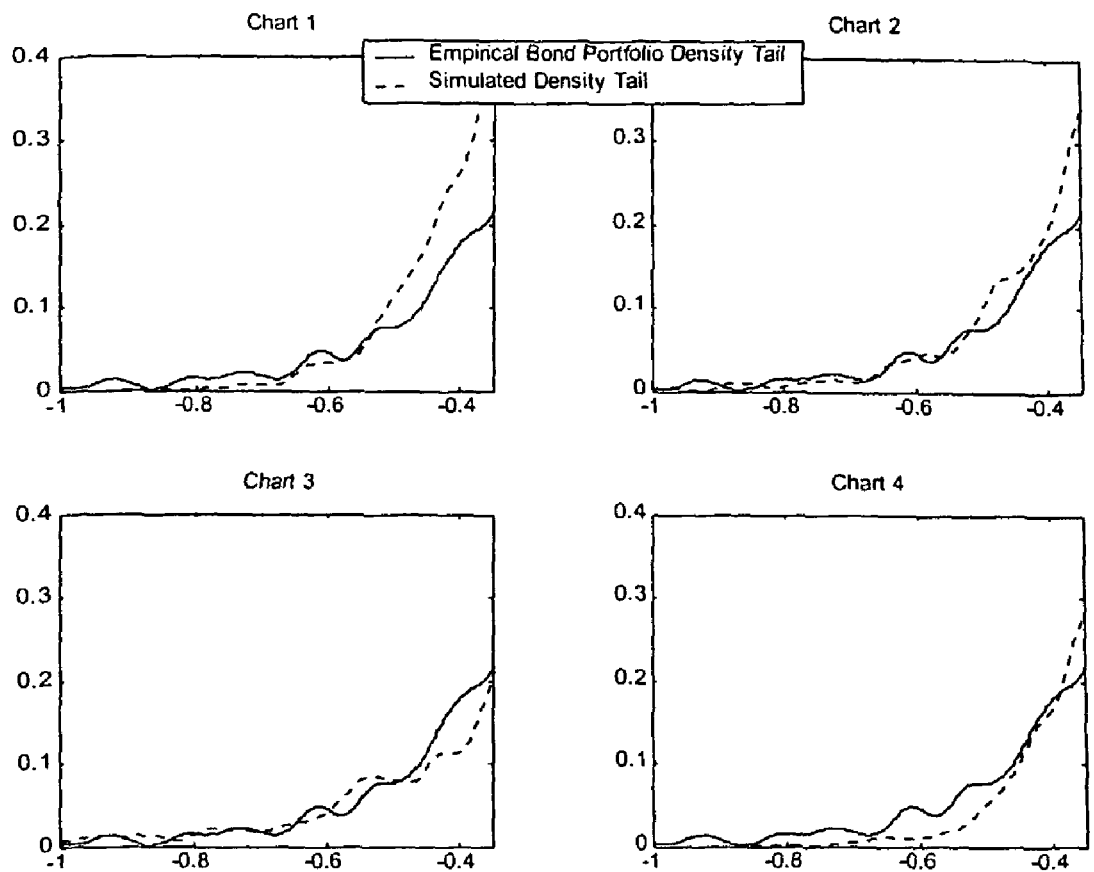
FIG. 19 shows four charts of tails of density functions. In all four charts the solid curve represents the tail of the Empirical Density Function of the portfolio return with equal weights of the individual indices, while the dashed line shows the tail of the portfolio return density obtained when log-changes of the risk factors are simulated like:
normal random variables with a covariance matrix estimated by the method of moments in the first chart;
stable sub-Gaussian random variables with a "truncated" covariance matrix estimated by the method of moments in the second chart;
stable Paretian random variables and the dependency is modeled using t-copulas in the third chart;
normal random variables and the dependency is modeled using t-copulas in the fourth chart.

Referring to FIG. 19, in all four charts the solid curve represents the tail of the Empirical Density Function of the portfolio return with equal weights of the individual indices, while the dashed line shows the tail of the portfolio return density obtained when log-changes of the risk factors are simulated like:

normal random variables with a covariance matrix estimated by the method of moments in the first chart;

stable sub-Gaussian random variables with a "truncated" covariance matrix estimated by the method of moments in the second chart;

stable Paretian random variables and the dependency is modeled using t-copulas in the third chart;

normal random variables and the dependency is modeled using t-copulas in the fourth chart.

Figure 20:
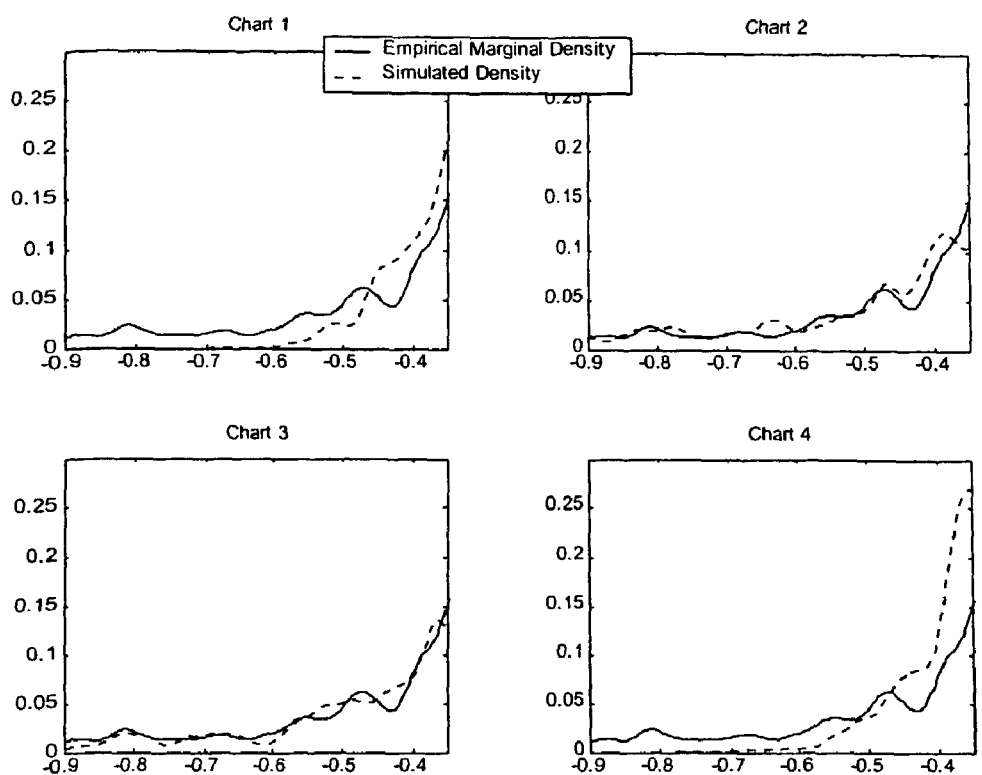
FIG. 20 shows four charts of tails of density functions. In all four charts the solid curve represents the tail of the Empirical Density Function of the marginal distribution of BBB—rated bond returns, while the dashed line shows the tail of the marginal density of BBB—rated bond returns obtained when log-changes of the risk factors are simulated like:
normal random variables with a covariance matrix estimated by the method of moments in the first chart;
stable sub-Gaussian random variables with a "truncated" covariance matrix estimated by the method of moments in the second chart;
Stable Paretian random variables and the dependency is modeled using t-copulas in the third chart;
Normal random variables and the dependency is modeled using t-copulas in the fourth chart.

Referring to FIG. 20, in all four charts the solid curve represents the tail of the Empirical Density Function of the marginal distribution of BBB—rated bond returns, while the dashed line shows the tail of the marginal density of BBB—rated bond returns obtained when log-changes of the risk factors are simulated like:

normal random variables with a covariance matrix estimated by the method of moments in the first chart;

stable sub-Gaussian random variables with a "truncated" covariance matrix estimated by the method of moments in the second chart;

stable Paretian random variables and the dependency is modeled using t-copulas in the third chart;

normal random variables and the dependency is modeled using t-copulas in the fourth chart.

Referring to the first charts on FIGS. 17 and 18, it is evident that the first method (where log-changes of the risk factors are multivariate normal random variables) cannot provide accurate approximation of both the portfolio and the marginal returns' distributions. This is also confirmed by the estimates for the KD and ADS statistics.

When the first method is applied, the values of the KD and the ADS statistics for the portfolio return are 0.0656 and 0.1860, respectively. The KD for the marginal distribution of the BBB—rated bond returns is 0.0670; the ADS statistic is 0.1800. Such values of KD and ADS statistics are unsatisfactory high.

Referring to the first charts on FIGS. 19 and 20 where the empirical and fitted normal tails of bond portfolio returns and of the BBB-rated bond return, respectively, are plotted, it is evident that the tail provided by the normal method for both the portfolio and the marginal distribution can not assign the proper probability of occurrence of extreme losses. This results in an underestimated VaR figure—the estimated 99% VaR according to the first method is 0.4411%.

Referring to the second chart on FIG. 17, the solid curve represents the Empirical Density Function of the portfolio return, while the dashed line now shows the portfolio return density obtained when log-changes of the risk factors are simulated like stable sub-Gaussian random variables with a "truncated" covariance matrix estimated by the method of moments. The estimated 99% VaR is 0.5268%. The estimated KD is 0.0547. The KD statistic is not significantly improved; however the ADS is 0.1176, which is better than the one observed with the normal case. This is illustrated on the second chart of FIG. 19 showing the tail fit of the method. It is clear that this method produces a heavy-tailed distribution for the portfolio return.

As shown on the second charts of FIGS. 19 and 21, a significant improvement occurs in modeling marginal distribution. This is confirmed by the good estimates of KD and ADS statistics—0.0262 and 0.0787, respectively. However, the fact that the KD statistics of marginal distributions are very good, but the KD statistic of the portfolio is worse leads to the conclusion that this method has a problem with modeling dependence structure.

Third charts of FIGS. 17, 18, 19 and 20, produced using a method covered by the present invention (log-changes of the risk factors are simulated like stable Paretian random variables and the dependency is modeled using t-copulas), present a method provides extremely good fit to both portfolio return density and marginal densities. The estimated KD and the ADS statistics for the portfolio return are 0.0287 and 0.0828, respectively. That is an improvement over the conventionally used normal method of around 2.3 times. The marginal KD and ADS are 0.0274 and 0.0724, respectively. The estimated 99% VaR is 0.6814%. These results confirm the dominance of the method proposed by the present invention over methods one and two.

Clearly, the copula approach introduces considerable improvement. However, the sole employment of a copula is not enough. Let us see what happens if we model the dependency with a copula assuming normal margins.

On the fourth chart of FIG. 17 the solid curve represents the Empirical Density Function of the portfolio return with equal weights of the individual indices, while the dashed line now shows the portfolio return density obtained when log-changes of the risk factors are simulated like normal random variables and the dependency is modeled using t-copulas. The KD and ADS are 0.0417 and 0.0932, respectively. The marginal KD and ADS are 0.0728 and 0.2051, respectively. Such estimates of KD and ADS statistics show that the accuracy of such a method is unsatisfactory. This is also illustrated on the fourth charts on FIGS. 19 and 20 where it is evident that such a method has thinner tails and cannot assign the proper probability of occurrence of extreme losses for both portfolio and marginal distribution. The 99% VaR is 0.4216%, which is even lower that the VaR according to the first (multivariate normal) method.

Figure 22:
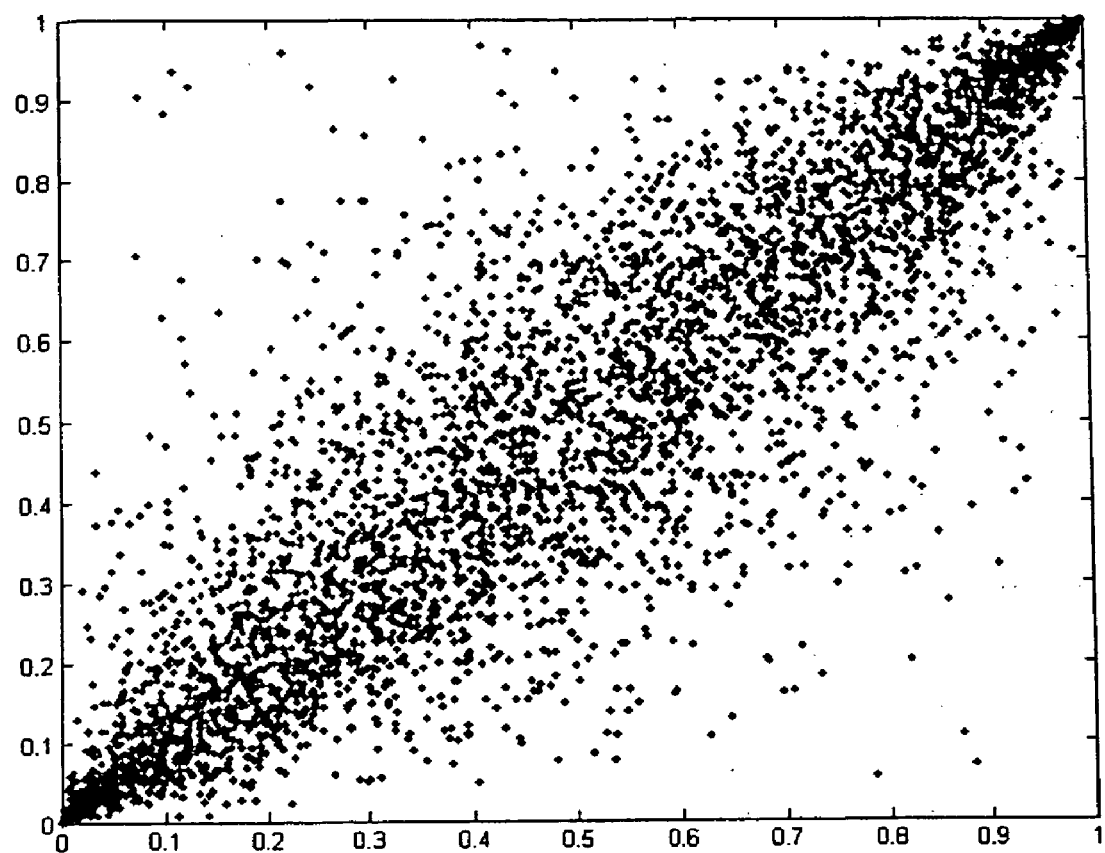
FIG. 22 shows 5000 simulations generated from a t-copula estimated assuming stable Paretian marginal distributions for the risk factors representing credit-spreads' log-returns.
Figure 23:
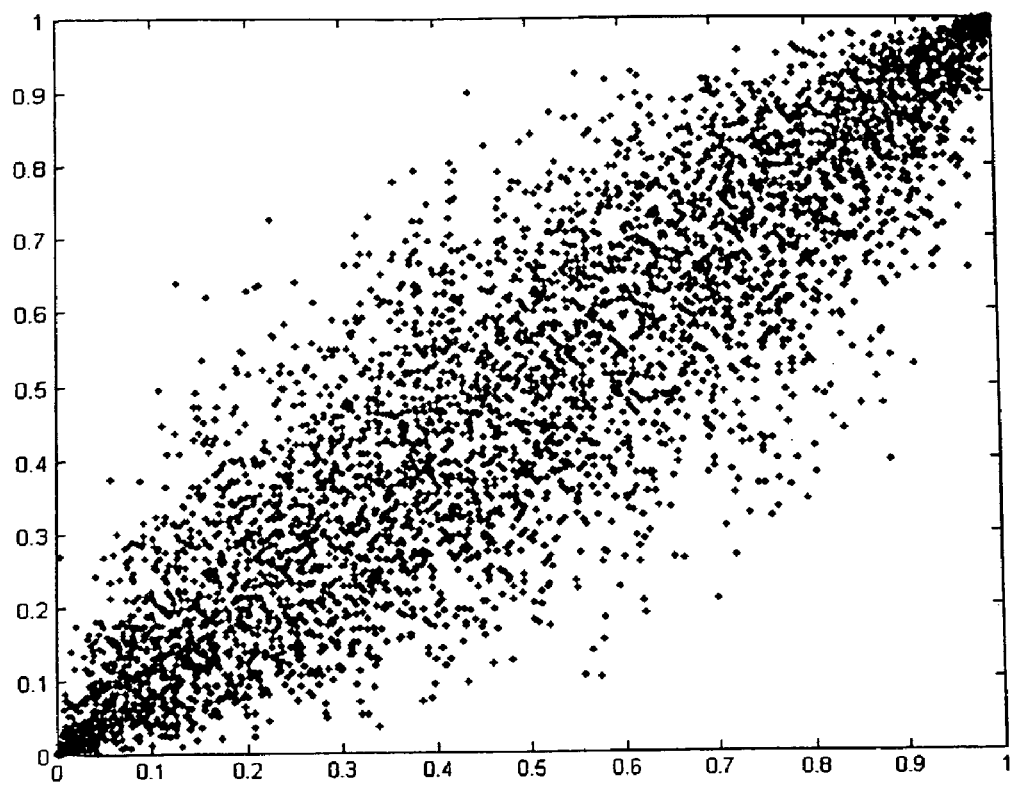
FIG. 23 shows 5000 simulations generated from a t-copula estimated assuming Gaussian marginal distributions for the risk factors representing credit-spreads' log-returns.

It should also be realized that the estimates of the copula parameters strongly depend on the assumption of the marginal distributions. FIG. 21 shows the copula parameter in the cases of stable Paretian (non-Gaussian) marginal distributions and Gaussian marginal distributions. FIGS. 22 and 23 show 5000 simulations generated from these two copulas. Clearly, the inaccurate choice of marginal distribution leads to the biased estimates of the copula parameters and thus will introduce errors in modeling dependency as well.

Thus, we claim that the combination of the approaches (stable Paretian marginal distributions plus copula approach in modeling dependency) is crucial for the accurate risk-factor scenario generation.

The economic impact is exhibited below: Assuming the methods are rated as "Green zone" according to the Basel Convention:

for the normal method, the allocated reserves for an investment of USD 1 million will be USD 13 233;

for the stable sub-Gaussian method with "truncated" covariance matrix, the allocated reserves for an investment of USD 1 million will be USD 15804;

for the stable Paretian method with a t-copula, the allocated reserves for an investment of USD 1 million will be 20442.

In order to satisfy the requirements of the Basel Committee and to be in the Green Zone, a Risk Management System must produce less than 4 exceedings per year (the exceeding appears when the actual loss observed during the next day is bigger that the predicted VaR figure).

Figure 24:
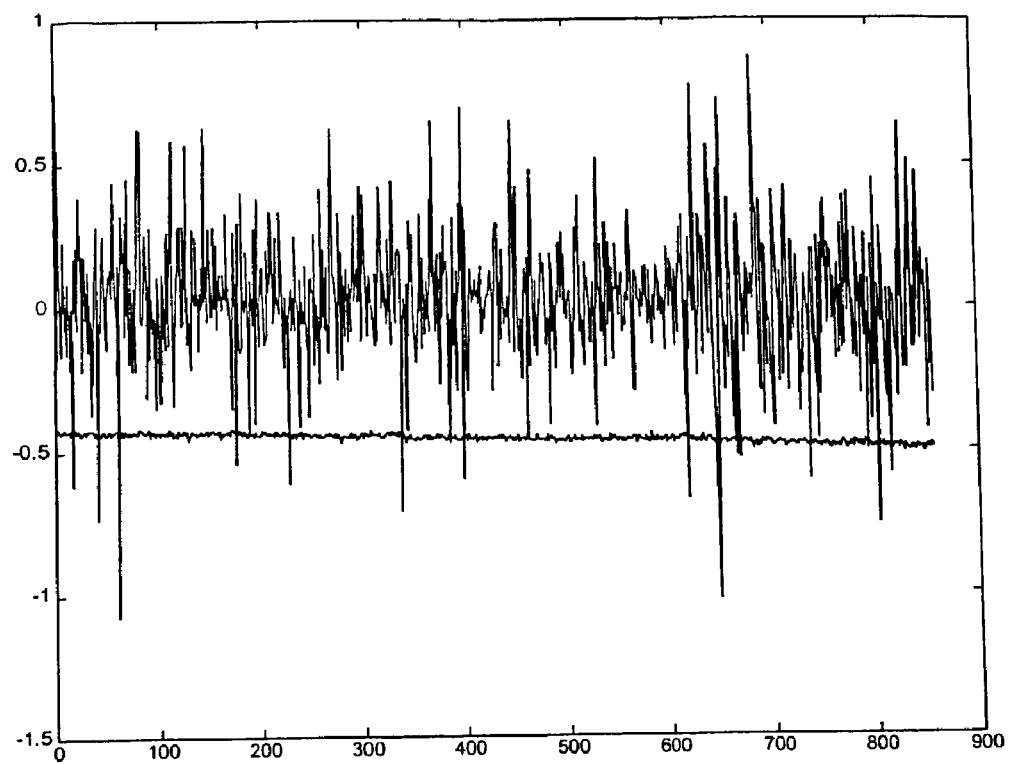
FIG. 24 shows the observed return of the sample portfolio and the estimated 99% one-day VaR according to the multivariate normal method for a period of 858 observations.
Figure 25:
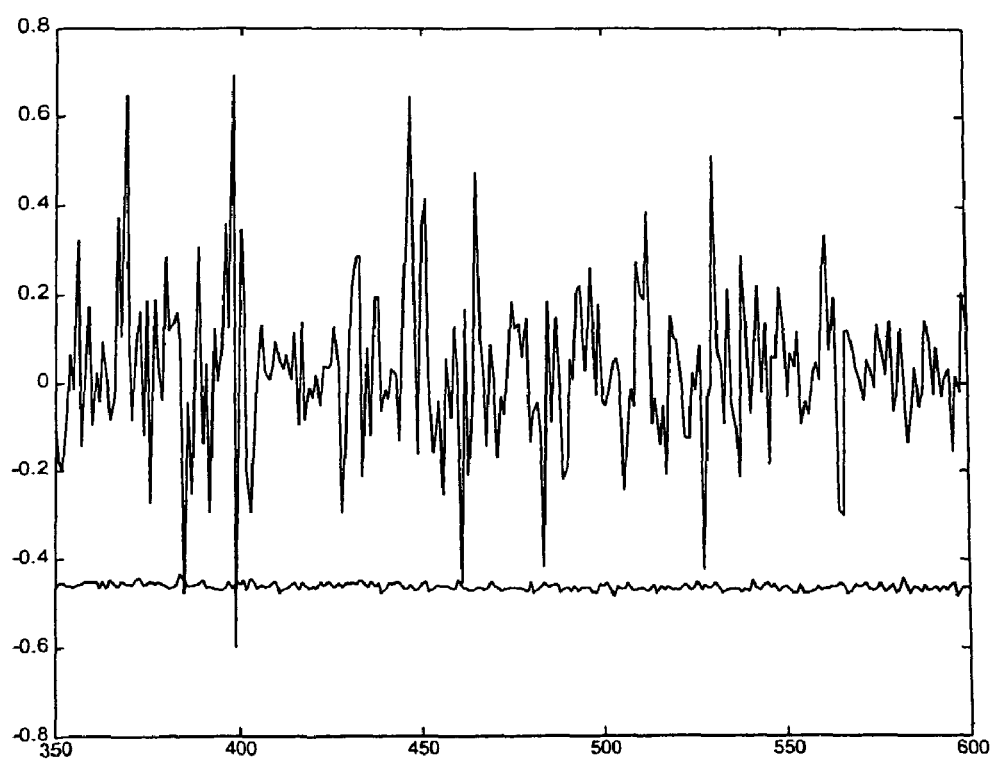
FIG. 25 shows the observed return of the sample portfolio and the estimated 99% one-day VaR according to the multivariate normal method for a period of market stability consisting of 255 observations.
Figure 26:
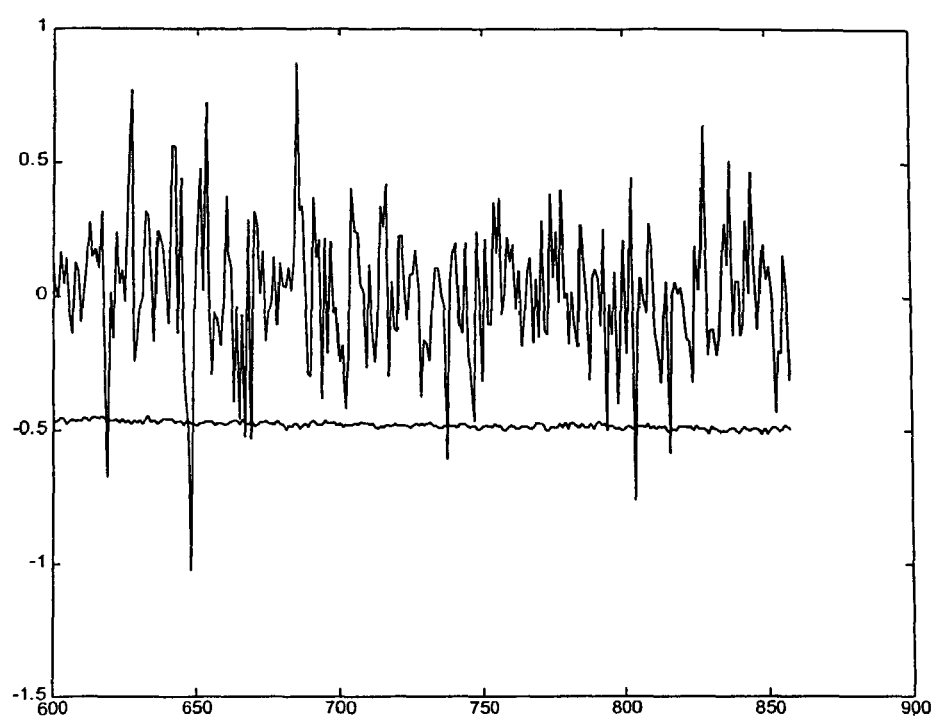
FIG. 26 shows the observed return of the sample portfolio and the estimated 99% one-day VaR according to the multivariate normal method for the period of market turbulence consisting of 255 observations.
Figure 27:
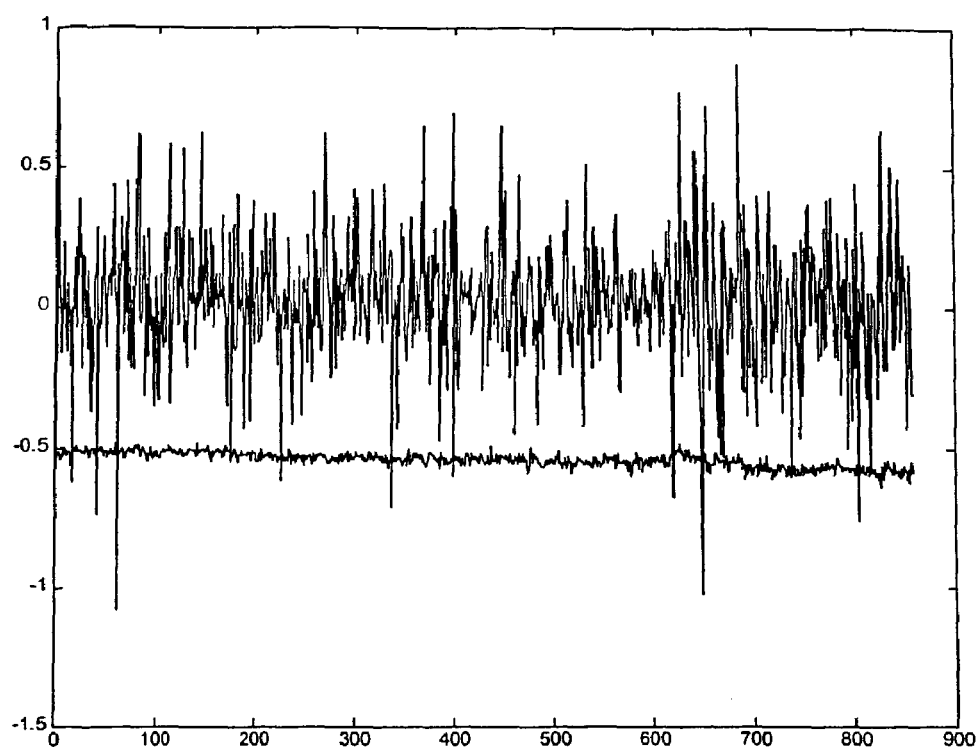
FIG. 27 shows the observed return of the sample portfolio and the estimated 99% one-day VaR according to the method where risk factor returns are modeled like Stable sub-Gaussian random variables with a "truncated" covariance matrix for a period of 858 observations.
Figure 28:
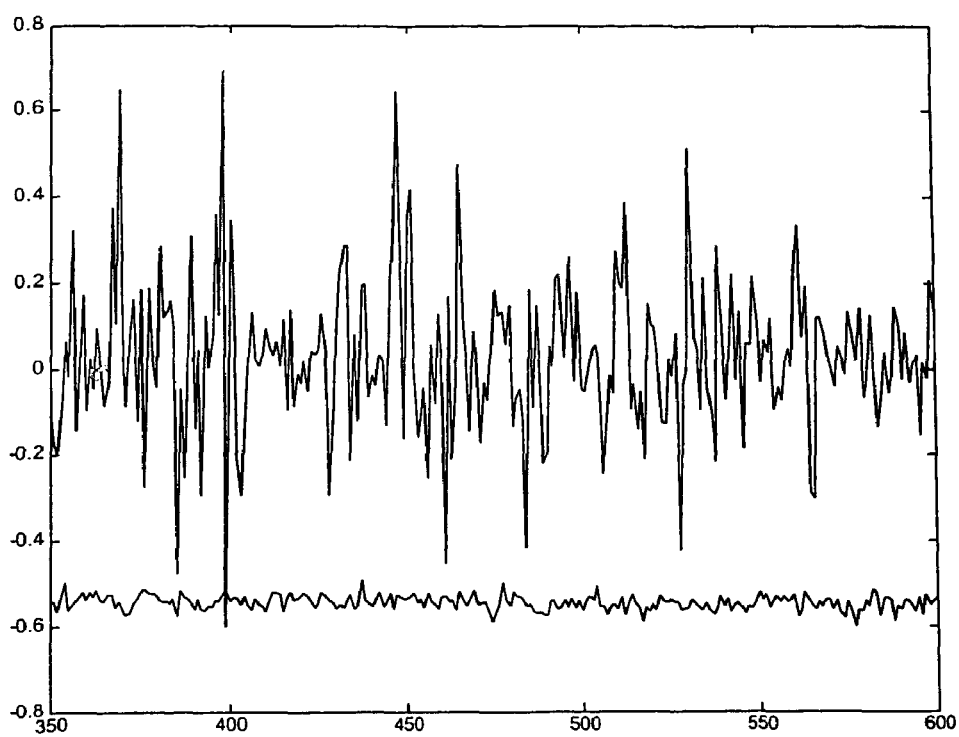
FIG. 28 shows the observed return of the sample portfolio and the estimated 99% one-day VaR according to the method where risk factor returns are modeled like Stable sub-Gaussian random variables with a "truncated" covariance matrix for a period of market stability consisting of 255 observations.
Figure 29:
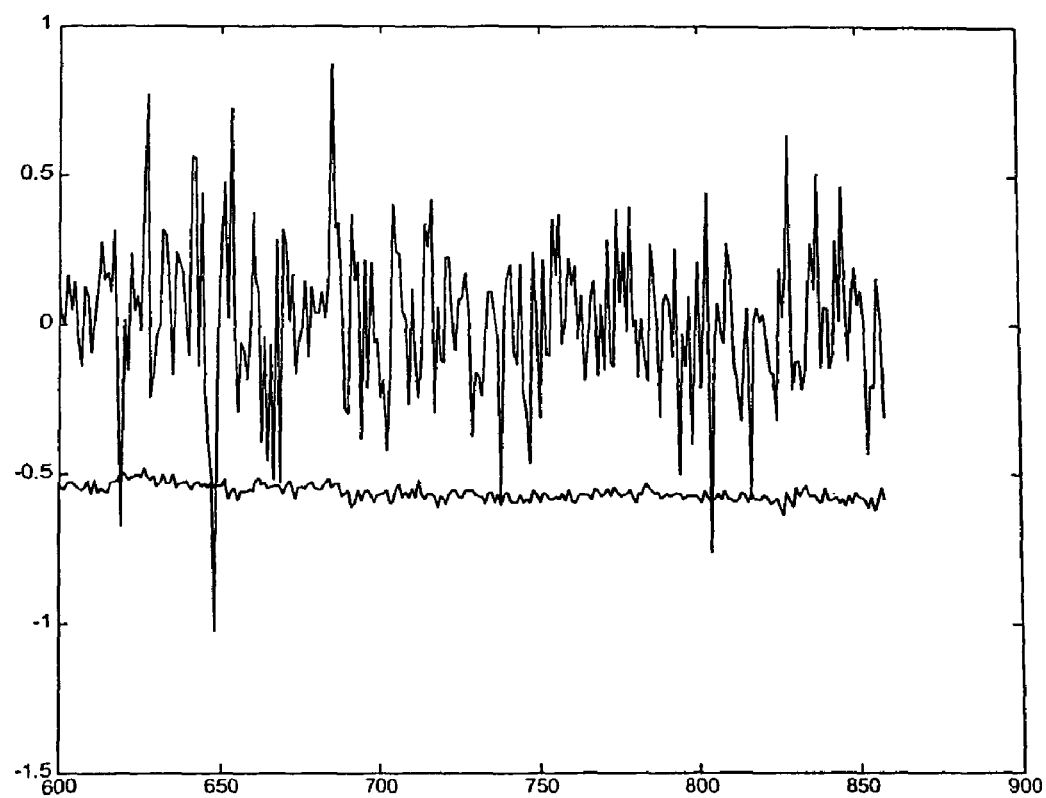
FIG. 29 shows the observed return of the sample portfolio and the estimated 99% one-day VaR according to the method where risk factor returns are modeled like Stable sub-Gaussian random variables with a "truncated" covariance matrix for the period of market turbulence consisting of 255 observations.
Figure 30:
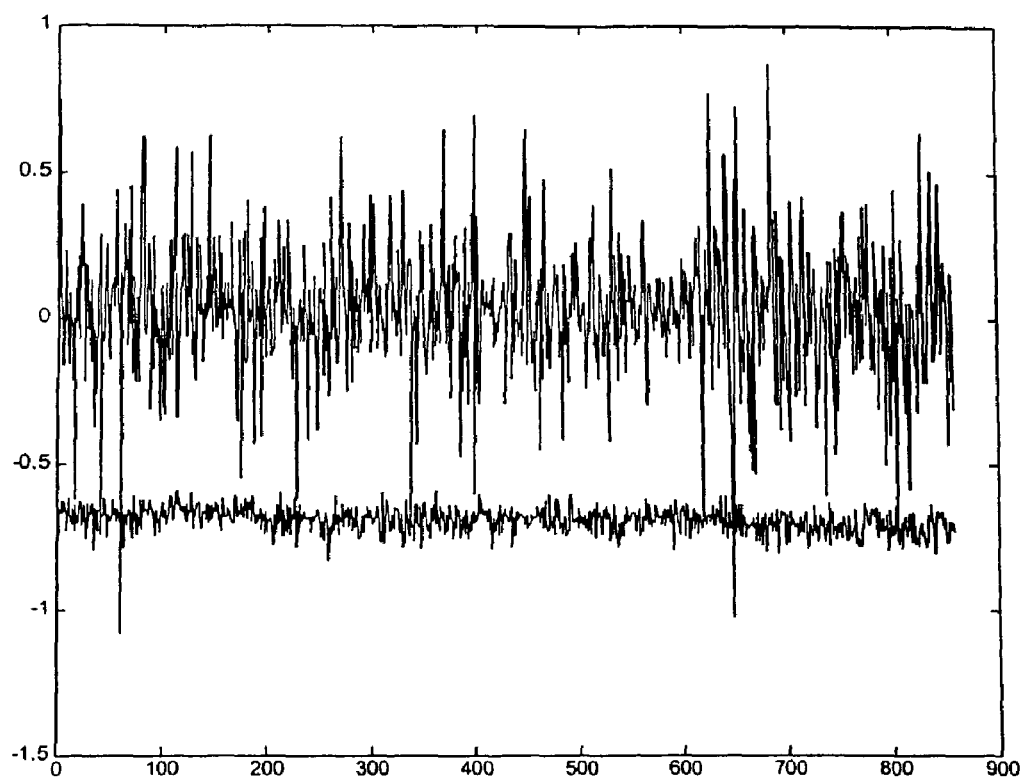
FIG. 30 shows the observed return of the sample portfolio and the estimated 99% one-day VaR according to the method where risk factor returns are modeled like Stable Paretian random variables and the dependency is modeled using t-copula for a period of 858 observations.
Figure 31:
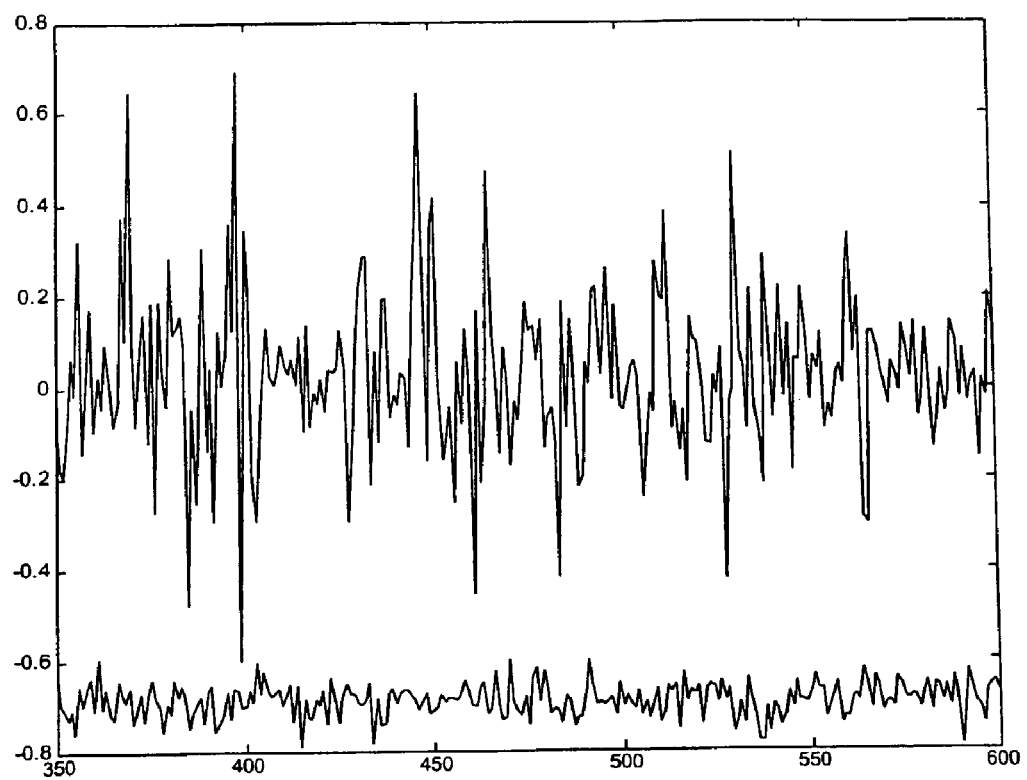
FIG. 31 shows the observed return of the sample portfolio and the estimated 99% one-day VaR according to the method where risk factor returns are modeled like Stable Paretian random variables and the dependency is modeled using t-copula for a period of market stability consisting of 255 observations.
Figure 32:
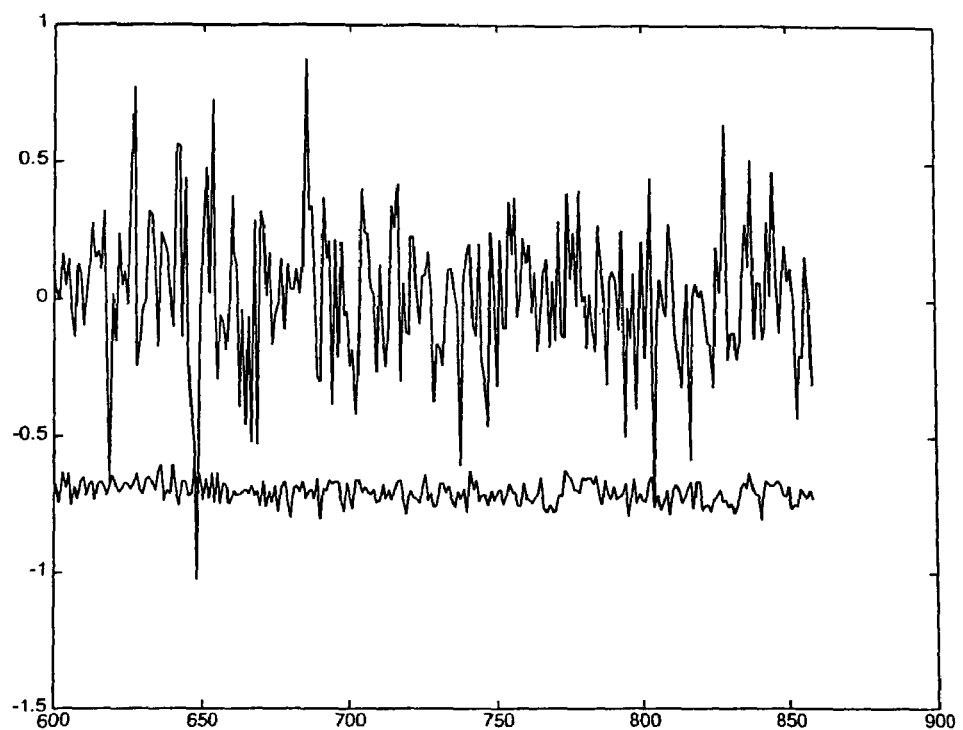
FIG. 32 shows the observed return of the sample portfolio and the estimated 99% one-day VaR according to the method where risk factor returns are modeled like Stable Paretian random variables and the dependency is modeled using t-copula for a period of market turbulence consisting of 255 observations.

We have calculated VaR figures according to the four above described methods for the period of the last 858 trading days of our data. FIGS. 24 and 27 show that in periods of market stability the above-described methods happen to fall in the "Green Zone." For example, for the period between the 350-th to 600-th day the normal method has two exceedings (refer to FIG. 25). Thus, if the method is evaluated during this period, it will be considered to be in the "Green Zone."

However, the next period appears to be more volatile. The normal method produces 9 exceedings and must be definitely downgraded to a "Red Zone" (refer to FIG. 26). It can be seen that there are two days (near the 70-th observation and near the 650-th observations) when the allocated capital reserves assuming that the method is in the green zone and, thus equal to three times the estimated VaR value, will hardly cover the real loss observed on the next date. Such deficiencies introduce substantial troubles to both regulators and financial institutions. Most likely, the financial institution shall be obliged to pay certain penalties. Moreover, such an unreliable behavior of the method harms the long-tem planning activities of the institution and, to some extent, poses a tension between the regulators and the institution.

The stable sub-Gaussian method of Mercury 1.5 provides an improvement having one exceeding in the first period and five in the second period. Unfortunately, the method of Mercury 1.5 cannot be considered a truly reliable one as well, since it also should be downgraded to a yellow zone during the second period.

The method covered by the present invention shows a steady behavior (see FIG. 30) having zero exceedings in the first period and only two exceedings over the second period. This is illustrated on FIGS. 32 and 33. For the whole period of 858 days, the latter method produces five exceedings at total (the 95% confidence interval for the number of exceedings within a period of 858 days is [3; 14]).

Let us consider another example, similar to the one discussed above. We construct a portfolio of indices and evaluate its risk. The following items constitute the portfolio:
NYSE Composite Index;
S&P 500;
Dow Jones Industrial Average;
Frankfurt DAX Index;
Tokyo NIKKEI Cash "SIMEX."

We will again rely on the two statistics KD and ADS defined in the previous example as a measure of how "close" the empirical portfolio return distribution and the distribution of the simulated returns are.

Figure 33:
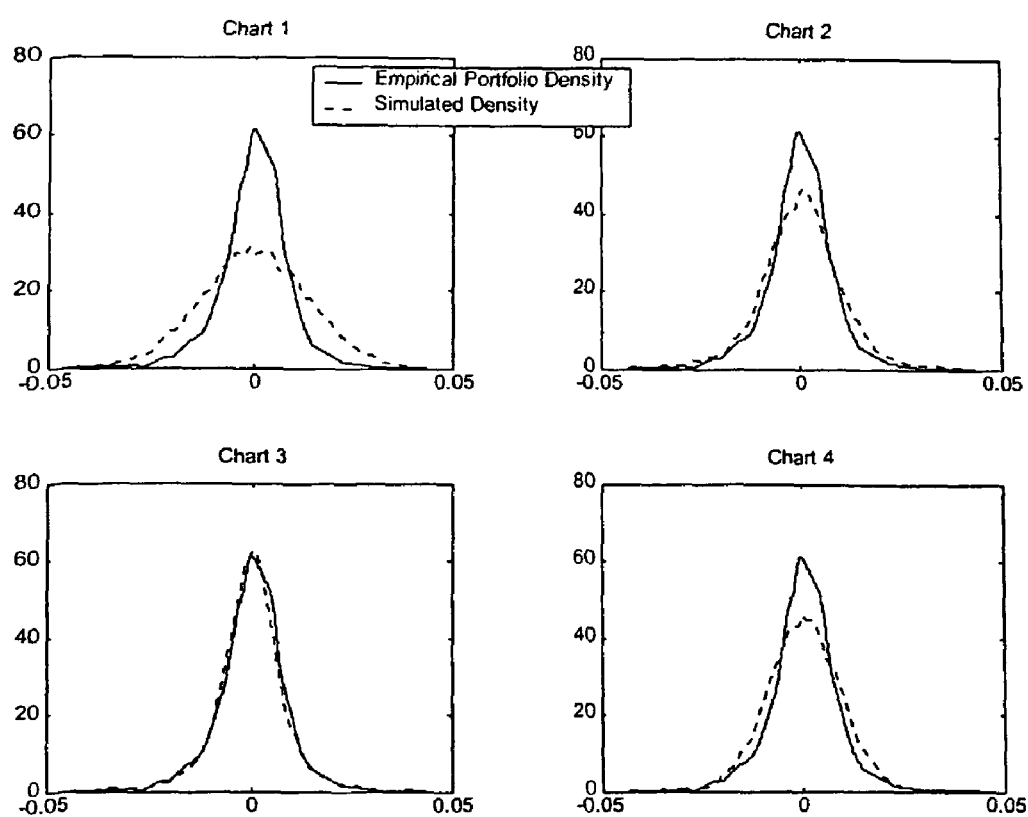
FIG. 33 shows four charts of density functions. The solid curve represents the Empirical Density Function of the portfolio return with equal weights of the individual indices, while the dashed line shows the portfolio return density obtained when log-changes of the risk factors are simulated like: normal random variables with a covariance matrix estimated by the method of moments in the first chart; stable sub-Gaussian random variables with a "truncated" covariance matrix estimated by the method of moments in the second chart; stable Paretian random variables and the dependency is modeled using t-copulas in the third chart; normal random variables and the dependency is modeled using t-copulas in the fourth chart.

Referring to FIG. 33, in all four charts the solid curve represents the Empirical Density Function of the portfolio return with equal weights of the individual indices, while the dashed line shows the portfolio return density obtained when log-changes of the risk factors are simulated like:
normal random variables with a covariance matrix estimated by the method of moments in the first chart;
stable sub-Gaussian random variables with a "truncated" covariance matrix estimated by the method of moments in the second chart;
stable Paretian random variables and the dependency is modeled using t-copulas in the third chart;
normal random variables and the dependency is modeled using t-copulas in the fourth chart.

Figure 34:
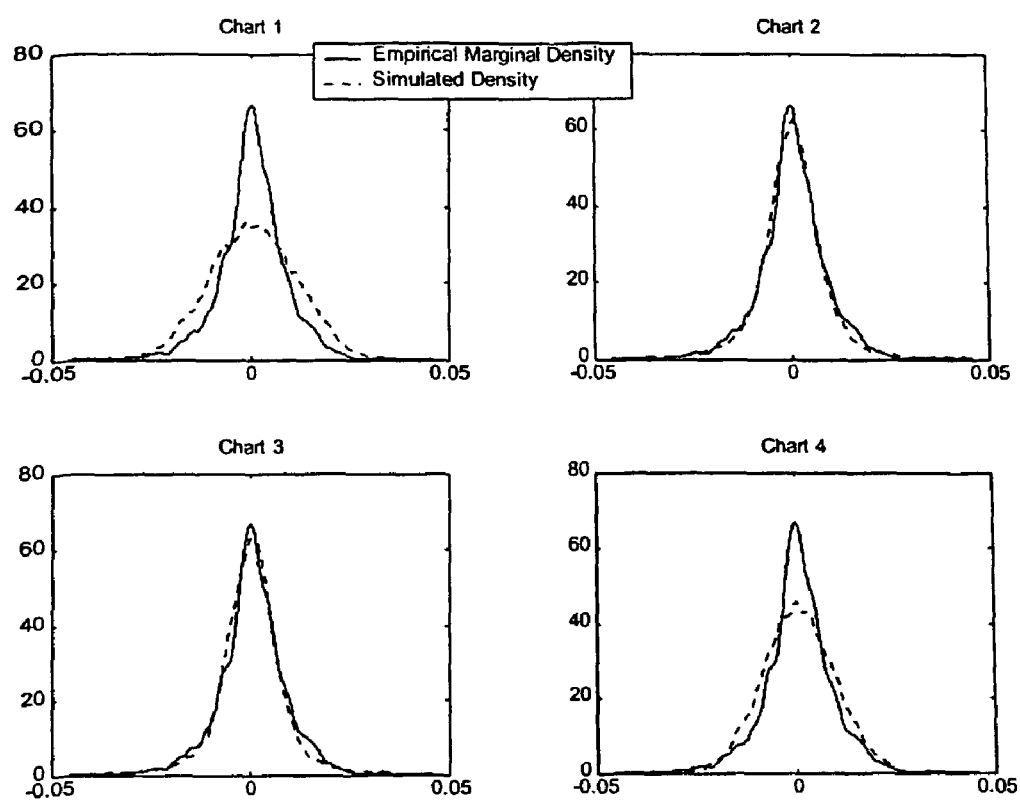
FIG. 34 shows four charts of density functions. The solid curve illustrates the marginal Empirical Density Function of returns of NYSE Composite Index, while the dashed line shows the marginal return density obtained when log-changes of the risk factors are simulated like: normal random variables with a covariance matrix estimated by the method of moments in the first chart; stable sub-Gaussian random variables with a "truncated" covariance matrix estimated by the method of moments in the second chart; stable Paretian random variables and the dependency is modeled using t-copulas in the third chart; normal random variables and the dependency is modeled using t-copulas in the fourth chart.

FIG. 34 illustrates the marginal fit of the first portfolio item, that is, the returns of NYSE Composite Index. Again, in all four charts, the solid curve represents the marginal Empirical Density Function of the NYSE Composite Index returns, while the dashed line shows the marginal return density obtained when log-changes of the risk factors are simulated like:
normal random variables with a covariance matrix estimated by the method of moments in the first chart;
stable sub-Gaussian random variables with a "truncated" covariance matrix estimated by the method of moments in the second chart;
stable Paretian random variables and the dependency is modeled using t-copulas in the third chart;
normal random variables and the dependency is modeled using t-copulas in the fourth chart.

Figure 35:
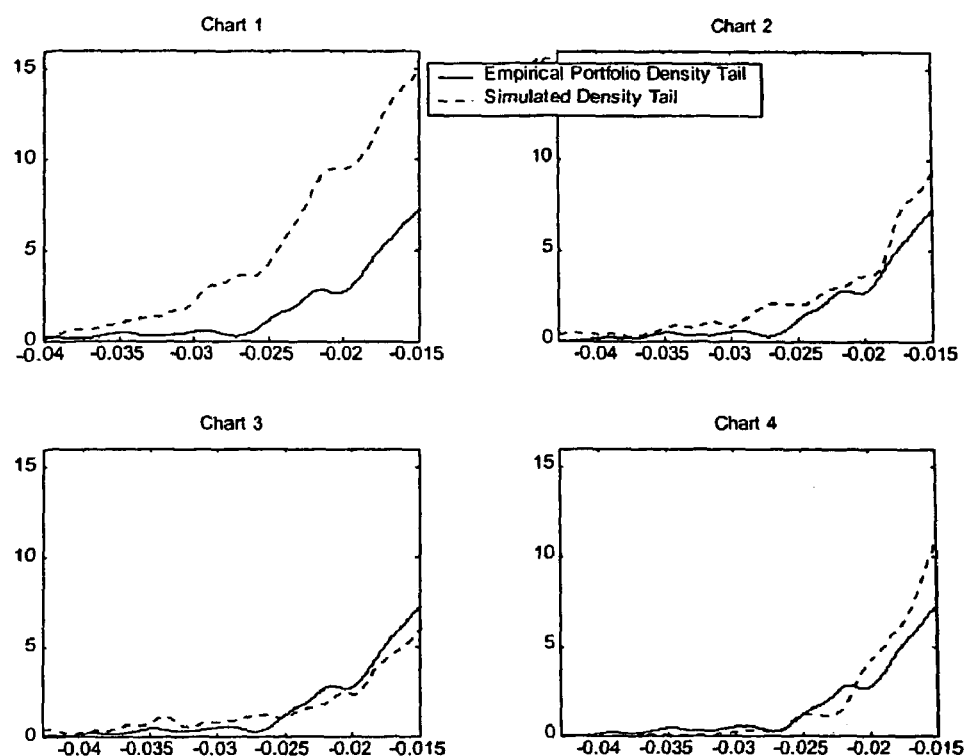
FIG. 35 shows four charts of density tails, where in all four charts the solid curve represents the tail of the Empirical Density Function of the portfolio return, while the dashed line shows the tail of the portfolio return density obtained when log-changes of the risk factors are simulated like: normal random variables with a covariance matrix estimated by the method of moments in the first chart; stable sub-Gaussian random variables with a "truncated" covariance matrix estimated by the method of moments in the second chart; stable Paretian random variables and the dependency is modeled using t-copulas in the third chart; normal random variables and the dependency is modeled using t-copulas in the fourth chart.

On all four charts of FIG. 35, the solid curve represents the tail of the Empirical Density Function of the portfolio return with equal weights of the individual indices, while the dashed line shows the tail of the portfolio return density obtained when log-changes of the risk factors are simulated like:
normal random variables with a covariance matrix estimated by the method of moments in the first chart;
stable sub-Gaussian random variables with a "truncated" covariance matrix estimated by the method of moments in the second chart;
stable Paretian random variables and the dependency is modeled using t-copulas in the third chart;
normal random variables and the dependency is modeled using t-copulas in the fourth chart.

Figure 36:
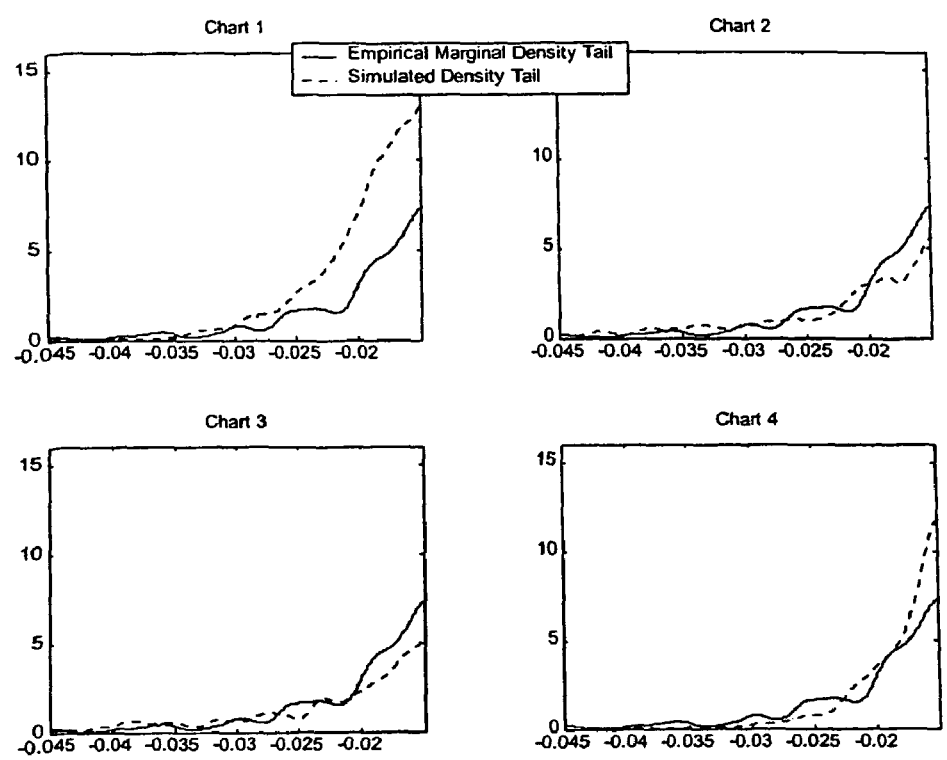
FIG. 36 shows four charts of density tails, where in all four charts the solid curve represents the tail of the Empirical Density Function of returns of NYSE Composite Index, while the dashed line shows the tail of the marginal return density obtained when log-changes of the risk factors are simulated like: normal random variables with a covariance matrix estimated by the method of moments in the first chart; stable sub-Gaussian random variables with a "truncated" covariance matrix estimated by the method of moments in the second chart; stable Paretian random variables and the dependency is modeled using t-copulas in the third chart; normal random variables and the dependency is modeled using t-copulas in the fourth chart.

FIG. 36 illustrates the tails of the marginal fits of the first portfolio item—the returns of NYSE Composite Index. In all four charts, the solid curve represents the tail of the marginal Empirical Density Function of the NYSE Composite Index returns, while the dashed line shows the tail of the marginal return density obtained when log-changes of the risk factors are simulated like:
normal random variables with a covariance matrix estimated by the method of moments in the first chart;
stable sub-Gaussian random variables with a "truncated" covariance matrix estimated by the method of moments in the second chart;
stable Paretian random variables and the dependency is modeled using t-copulas in the third chart;
normal random variables and the dependency is modeled using t-copulas in the fourth chart.

For the first method the estimated 99% VaR is 0.0300. The estimated KD and the ADS are 0.1502 and 0.6084, respectively. The KD and ADS of the Marginal distribution of the returns of NYSE Composite Index are 0.1091 and 0.3346 respectively. Here the KD and ADS statistics are even worse that those obtained by the multivariate normal method in the previous example. The poor quality of the method is also evident when referring to the first charts on FIGS. 33 to 36.

According to the second method, the estimated 99% VaR is 0.0349. The estimated portfolio KD is 0.0707 and the ADS is 0.1902. The KD and ADS of the Marginal distribution of the returns of NYSE Composite Index are now 0.0256 and 0.1046, respectively. The improvement is also evident in the second charts of FIGS. 33 to 36. The KD and ADS statistics are still high.

According to the third method (when log-changes of the risk factors are simulated like stable Paretian random variables and the dependency is modeled using t-copulas) which is covered by the present invention, the estimated 99% VaR is 0.0365 The estimated KD and the ADS are 0.0390 and 0.1039, respectively. The KD statistic is improved 4.8 times and the ADS statistic is improved almost 6 times over the conventionally used multivariate normal method. The marginal KD and ADS are 0.0313 and 0.0893, respectively.

The fits illustrated on the third charts of FIGS. 33 to 36 confirm the dominance of the method covered by the present invention.

In order to demonstrate once again that the combination of the approaches (stable Paretian marginal distributions plus copula approach in modeling dependency) is crucial for the accurate risk-factor scenario generation, the KD and ADS statistics produced by the method utilizing Gaussian marginal distributions and t-copula are reported—portfolio returns KD statistic is 0.0678 and ADS is 0.1723. The marginal KD and ADS are 0.0748 and 0.1699, respectively. The fourth charts on the FIGS. 34 to 37 also show that such a method does not provide high degree of accuracy. The 99% VaR estimated according to the fourth method is 0.0202—it is again less that the VaR suggested by the multivariate normal method.

Thus, the present invention provides significant advantages over other Risk Management Systems:
provides a possibility to use flexible multivariate distribution exhibiting heavy-tails, skewness and different dependence structure, and characterizing the whole distribution of a given financial variable;
provides possibilities for flexible stress tests on all levels;
provides fast analyses due to the possibility to use intermediate results in many subsequent calculations;
provides fast analyses thanks to the possibility intermediate results to be used by many users;
provides fast analyses because of the possibility to employ several calculation and generation engines.

Implementation of other aspects of the invention follow readily from knowledge of the basic invention. The invention may be implemented in hardware or software, or a combination of both. However, preferably, the invention is implemented in computer programs executing on programmable computers each comprising at least one processor, a data storage system (including volatile and non-volatile memory and/or storage elements), at least one input device, and at least one output device. Program code is applied to input data to perform the functions described herein and generate output information. The output information is applied to one or more output devices, in known fashion.

Each program is preferably implemented in a high-level procedural or object oriented programming language to communicate with a computer system. However, the programs can be implemented in assembly or machine language, if desired. In any case, the language may be a compiled or interpreted language.

Each such computer program is preferably stored on a storage media or device (e.g., ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method for estimating risk characteristics of portfolios of financial instruments, the computer-implemented method comprising the steps of:
maintaining a database of electronically stored information comprising a plurality of scenarios, sets of instruments, sets of risk factors, and portfolio weights for the instruments;
selecting a required number of scenarios, a set of instruments with corresponding amounts, a set of risk factors, and one or more sets of portfolio weights for each of the set of instruments from the database by a user through an input device for input into a memory;
maintaining a network operatively coupled and providing communication between the database, the input device, and a computer processor coupled to the memory;
processing the selected information by the computer processor coupled to the memory, comprising:
transforming historical observations for the set of risk factors to a stationary homogenous time-series comprising transformed historical observations;
obtaining stable Paretian parameters describing a heavy tailed and asymmetric distribution for the transformed historical observations in the set of risk factors by estimating stable Paretian parameters based on the transformed historical observations;
generating a set of stable Paretian scenarios from the heavy tailed and asymmetric distribution for the set of risk factors by simulating dependent stable Paretian random variables based on the estimated Paretian parameters, wherein the distribution is performed in accordance with the equation:

$$\Phi R(\theta) = E(\exp(iR\theta)) = \exp\{-\sigma^\alpha |\theta|^\alpha (1 - i\beta(sgn\theta)\tan\frac{\pi\alpha}{2}) + i\mu\theta\}, \text{ if } \alpha \neq 1$$

and $$\Phi R(\theta) = E(\exp(iR\theta)) = \exp\{-\sigma|\theta|(1 + i\beta(sgn\theta)\ln\theta) + i\mu\theta\}, \text{ if } \alpha = 1$$

where $\alpha$, $\beta$, $\sigma$, and $\mu$ are the estimated Paretian parameters, $\alpha$ is an index of stability, $0<\alpha\leq 2$, $\beta$ is a skewness parameter, $-1\leq\beta\leq 1$, $\sigma$ is a scale parameter, $\sigma\geq 0$, and $\mu$ is a location parameter, $\Phi$ is notation for the characteristic function of the random variable R which is stable distributed, $\theta$ is a parameter of the characteristic function and is any real number, R is a stable random variable, i is an imaginary unit, where $i^2=-1$, E is notation for mathematical expectation;
transforming the stable Paretian scenarios into risk factor value scenarios by applying a transformation inverse to the one performed on the historical observations;
estimating instrument characteristics of at least one instrument in the set of instruments under each risk factor value scenario;
estimating risk characteristics of the portfolio of instruments based on the estimated instrument characteristics; and
generating a report for the risk characteristics of the portfolio of instruments for output.

2. The method of claim 1 wherein the step of generating a set of stable Paretian scenarios from the heavy tailed and asymmetric distribution for the set of risk factors comprises the steps of:
converting the set of transformed historical observations for each risk factor in the set of risk factors to a uniform distribution by applying at least one of stable Paretian distribution function with the obtained stable Paretian parameters and empirical distribution function to each observation of the set of transformed historical observations;

obtaining distribution parameters of a chosen class of copula distribution by using estimations based on data resulting from the converting step for the set of transformed historical observations;

obtaining copula scenarios based on the copula distribution by generating random variables following the copula distribution;

generating scenarios with normal one-dimensional marginal distributions and the copula distribution by applying inverse normal distribution function to each component of the obtained copula scenarios;

obtaining stable subordinator simulations for each risk factor in the set of risk factors by generating stable subordinator simulations based on the obtained stable Paretian parameters of the risk factor in the set of risk factors; and obtaining the set of stable Paretian scenarios for the set of risk factors by multiplying each component of each of the obtained normal scenarios with the corresponding stable subordinator simulation.

3. The method of claim 1 wherein the step of generating a set of stable Paretian scenarios from the heavy tailed and asymmetric distribution for the set of risk factors comprises the steps of:

converting the set of transformed historical observations for each risk factor in the set of risk factors to a uniform distribution by applying at least one of stable Paretian distribution function with the obtained stable Paretian parameters and empirical distribution function to each observation of the set of transformed historical observations;

obtaining distribution parameters of a chosen class of copula distribution, by using estimations based on data resulting from the converting step for the set of transformed historical observations;

obtaining copula scenarios based on the copula distribution by generating random variables following the copula distribution; and obtaining the set of stable Paretian scenarios for the set of risk factors by applying to each component of each of the obtained copula scenarios the inverse stable Paretian distribution function with the estimated stable Paretian parameters for the corresponding risk factor.

4. The method of claim 1 wherein the step of transforming historical observations is performed in parallel on subsets of the set of risk factors.

5. The method of claim 1 wherein the step of obtaining stable Paretian parameters is performed in parallel on subsets of the set of risk factors.

6. The method of claim 1 wherein the step of transforming the stable Paretian scenarios is performed in parallel on subsets of the set of risk factors.

7. The method of claim 1 wherein the step of estimating instrument characteristics is performed in parallel on subsets of the set of instruments.

8. The method of claim 2 wherein the converting step is performed in parallel on subsets of the set of risk factors.

9. The method of claim 2 wherein the step of obtaining stable subordinator simulations is performed in parallel on subsets of the set of risk factors.

10. The method of claim 2 wherein the step of obtaining the set of stable Paretian scenarios is performed in parallel on subsets of the set of risk factors.

11. The method of claim 2 wherein the step of obtaining copula scenarios is performed in parallel on subsets of the set of scenarios.

12. The method of claim 2 wherein the step of generating scenarios is performed in parallel on subsets of the set of scenarios.

13. The method of claim 2 wherein the step of obtaining stable subordinator simulations is performed in parallel on subsets of the set of scenarios.

14. The method of claim 3 wherein the converting step is performed in parallel on subsets of the set of risk factors.

15. The method of claim 3 wherein the step of obtaining the set of stable Paretian scenarios is performed in parallel on subsets of the set of risk factors.

16. The method of claim 3 wherein the step of obtaining copula scenarios is performed in parallel on different subsets of scenarios.

17. The method of claim 3 wherein the step of obtaining the set of stable Paretian scenarios is performed in parallel on different subsets of scenarios.

18. The method of claim 1 wherein each step is performed by at least two users, each of the two users producing risk characteristics for generally different selected sets of instruments.

19. A computer-implemented risk management system for estimating risk characteristics, comprising:

a database of electronically stored information comprising a plurality of scenarios, sets of instruments, sets of risk factors, and portfolio weights for the instruments;

an input device to receive selections from a user of a required number of scenarios, a set of instruments with corresponding amounts, a set of risk factors, and one or more sets of portfolio weights for each of the set of instruments from the database by a user through an input device for input into a memory;

a network operatively coupled and providing communication between the database, memory, the input device, and a computer processor coupled to the memory, wherein the processor is programmed to execute program modules, the program modules comprising:

at least one Transformation Module from each type of Transformation Module out of a pre-defined non-empty set of Transformation Module types that transforms a set of risk factors' historical observations into a stationary homogenous time-series;

a Stable Scenarios Module comprising:

at least one Stable Parameters Estimation Module from each type out of a pre-defined non-empty set of Stable Parameters Estimation Module types, that estimates stable Paretian parameters describing a heavy tailed and asymmetric distribution over a set of time-series data;

at least one Copula Parameters Estimation Module from each type out of a pre-defined non-empty set of Copula Parameters Estimation Module types, that estimates copula parameters for a given class of copula distributions over a set of time-series data;

at least one Stable Simulations Module from each type out of a pre-defined non-empty set of Stable Simulations Module types, that generates stable Paretian random scenarios from the heavy tailed and asymmetric distribution, wherein the distribution is performed in accordance with the equation:

$$\Phi R(\theta) = E(\exp(iR\theta)) = \exp\{-\sigma^\alpha |\theta|^\alpha (1 - i\beta(sgn\theta)\tan\frac{\pi\alpha}{2}) + i\mu\theta\}, \text{ if } \alpha \neq 1$$

and $\Phi R(\theta) = E(\exp(iR\theta)) = \exp\{-\sigma|\theta|(1+i\beta(sgn\theta)\ln\theta)+i\mu\theta\}$, if $\alpha=1$ where $\alpha$, $\beta$, $\sigma$, and $\mu$ are the estimated Paretian parameters, α is an index of stability, $0<\alpha\leq 2$, β is a skewness parameter, $-1\leq\beta\leq 1$, σ is a scale parameter, $\sigma\geq 0$, and μ is a location parameter, Φ is notation for the characteristic function of the random variable R which is stable distributed, θ is a parameter of the characteristic function and is any real number, R is a stable random variable, i is an imaginary unit, where $i^2=-1$, E is notation for mathematical expectation;

at least one Copula Simulations Module from each type out of a pre-defined non-empty set of Copula Simulations Module types, that generates random variables from a given copula distribution; and at least one Normal Distribution Module from each type out of a pre-defined non-empty set of Normal Distribution Module types, that transforms a random number having uniform distribution to a random number having normal distribution and vice versa;

at least one Instrument Characteristics Estimation Module from each type out of a pre-defined non-empty set of Instrument Characteristics Estimation Module types, that estimates given instrument characteristic of an instrument under a set of risk factor value scenarios;

at least one Inverse Transformation Module from each type out of a pre-defined non-empty set of Inverse Transformation Module types that transforms the set of stable Paretian scenarios comprising the heavy tailed and asymmetric distribution for the set of risk factors to risk factor value scenarios;

at least one Risk Characteristics Module from each type out of a pre-defined non-empty set of Risk Characteristics Module types, that estimates given risk characteristic under a set of Instrument Characteristic scenarios; and an output device operatively coupled to the database, the memory, the computer processor, and the network to generate and output a report for the risk characteristics of the portfolio of instruments.

20. A risk management system of claim 19, wherein the system comprises at least two of the Transformation Modules, each of the at least two Transformation Modules operating in parallel to transforms risk factors' historical observations for different sub-sets of risk factors.

21. A risk management system of claim 19, wherein the system comprises at least two of the Inverse Transformation Modules, each of the at least two Inverse Transformation Modules operating in parallel to transforms risk factors' stable Paretian scenarios comprising the heavy tailed and asymmetric distribution for different sub-sets of risk factors.

22. A risk management system of claim 19, wherein the system comprises at least two of the Stable Parameters Estimation Modules, each of the at least two Stable Parameters Estimation Modules operating in parallel to produce stable Paretian parameters describing a heavy tailed and asymmetric distribution for different sub-sets of risk factors.

23. A risk management system of claim 19, wherein the system comprises at least two of the Stable Simulation Modules, each of the at least two Stable Simulation Modules operating in parallel to produce stable Paretian scenarios for at least one of different sub-sets of the required set of scenarios and different sub-sets of risk factors.

24. A risk management system of claim 19, wherein the system comprises at least two of the Copula Parameters Estimation Modules, each of the at least two Copula Parameters Estimation Modules operating in parallel to produce copula parameters for different sub-sets of risk factors.

25. A risk management system of claim 19, wherein the system comprises at least two of the Copula Simulation Modules, each of the at least two Copula Simulation Modules operating in parallel to produce copula scenarios for different sub-sets of the required set of copula scenario.

26. A risk management system of claim 19, wherein the system comprises at least two of the Normal Distribution Modules, each of the at least two Normal Distribution Modules operating in parallel to transform a random number having uniform distribution to a random number having normal distribution and vice versa for different sub-set random numbers.

27. A risk management system of claim 19, wherein the system comprises at least two of the Instrument Characteristics Estimation Modules, each of the at least two Instrument Characteristics Estimation Modules operating in parallel to produce instrument characteristic scenarios under different sub-sets of stable Paretian scenarios.

28. A risk management system of claim 19, wherein the system comprises at least two of the Risk Characteristics Estimation Modules, each of the at least two Risk Characteristics Estimation Modules operating in parallel to produce risk characteristic under different sub-sets of instrument characteristic scenarios.

\* \* \* \* \*